United States Patent
Tahara et al.

(10) Patent No.: US 11,527,364 B2
(45) Date of Patent: Dec. 13, 2022

(54) MULTILAYER CERAMIC ELECTRONIC COMPONENT INCLUDING A PLURALITY OF BODIES AND METAL TERMINALS CONNECTED TO OUTER ELECTRODES

(71) Applicant: Murata Manufacturing Co., Ltd., Nagaokakyo (JP)

(72) Inventors: Retsu Tahara, Nagaokakyo (JP); Tomohiro Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 144 days.

(21) Appl. No.: 16/443,903

(22) Filed: Jun. 18, 2019

(65) Prior Publication Data
US 2020/0006006 A1    Jan. 2, 2020

(30) Foreign Application Priority Data
Jun. 27, 2018   (JP) .............................. JP2018-122293

(51) Int. Cl.
  *H01G 4/232*   (2006.01)
  *H01G 4/30*    (2006.01)
  *H01G 4/38*    (2006.01)

(52) U.S. Cl.
  CPC ............. *H01G 4/38* (2013.01); *H01G 4/232* (2013.01); *H01G 4/30* (2013.01)

(58) Field of Classification Search
  CPC ............. H01G 4/30; H01G 4/232; H01G 4/38
  See application file for complete search history.

(56) References Cited

U.S. PATENT DOCUMENTS 6,288,887 B1    9/2001  Yoshida et al.
9,646,769 B2 *  5/2017  Park ..................... H01G 4/12
(Continued)

FOREIGN PATENT DOCUMENTS

CN    1707709 A    12/2005
JP    62-7109 A    1/1987
(Continued)

OTHER PUBLICATIONS

Official Communication issued in corresponding Japanese Patent Application No. 2018-122293, dated Oct. 20, 2020.
(Continued)

*Primary Examiner* — David M Sinclair
(74) *Attorney, Agent, or Firm* — Keating & Bennett, LLP

(57) ABSTRACT

A multilayer ceramic electronic component includes multilayer ceramic electronic component bodies which each include a multilayer body and first and second outer electrodes provided on both end surfaces of the multilayer body. The multilayer ceramic electronic component also includes a first metal terminal connected to the first outer electrodes and a second metal terminal connected to the second outer electrodes. Each multilayer ceramic electronic component body includes a dimension in a lamination direction that is less than a dimension in a width direction, and is positioned so that one of the first and second side surfaces faces a mounting surface. The first and second metal terminals extend between the first and second outer electrodes of the multilayer ceramic electronic component bodies. The multilayer bodies, first and second outer electrodes, and at least portions of the first and second metal terminals are covered by a cover material.

19 Claims, 28 Drawing Sheets

(56) References Cited

U.S. PATENT DOCUMENTS

| | | | |
|---|---|---|---|
| 2002/0080550 A1 | 6/2002 | Hidaka et al. | |
| 2005/0249969 A1* | 11/2005 | Xu | H01L 23/49582 428/647 |
| 2009/0147440 A1* | 6/2009 | Cygan | H01G 4/232 361/306.3 |
| 2010/0188798 A1* | 7/2010 | Togashi | H01G 4/232 361/306.3 |
| 2010/0238604 A1 | 9/2010 | Oh | |
| 2015/0296623 A1* | 10/2015 | Trinh | H01G 4/38 174/260 |
| 2016/0118190 A1* | 4/2016 | Park | H01G 2/06 174/260 |
| 2016/0219739 A1* | 7/2016 | Park | H01G 2/06 |
| 2016/0260546 A1* | 9/2016 | Mori | H01G 4/12 |
| 2017/0169956 A1* | 6/2017 | Miller | H01G 4/40 |
| 2018/0047507 A1 | 2/2018 | Koini et al. | |
| 2018/0240596 A1* | 8/2018 | Son | H01G 4/248 |
| 2018/0294100 A1* | 10/2018 | Ando | H01G 4/232 |
| 2019/0008036 A1* | 1/2019 | Park | H05K 3/3426 |
| 2019/0115156 A1* | 4/2019 | Konrad | H01G 2/065 |
| 2019/0304691 A1* | 10/2019 | Ando | H01G 4/232 |

FOREIGN PATENT DOCUMENTS

| | | | | |
|---|---|---|---|---|
| JP | 02-45620 U | | 3/1990 | |
| JP | 0459124 U | * | 5/1992 | |
| JP | 07-249541 A | | 9/1995 | |
| JP | 9-266125 A | | 10/1997 | |
| JP | 2000-235932 A | | 8/2000 | |
| JP | 2002-025852 A | | 1/2002 | |
| JP | 2004-172562 A | | 6/2004 | |
| JP | 2004-273935 A | | 9/2004 | |
| JP | 2005-317607 A | | 11/2005 | |
| JP | 2006-24825 A | | 1/2006 | |
| JP | 2008-172050 A | | 7/2008 | |
| JP | 2008227101 A | * | 9/2008 | |
| JP | 2008-277505 A | | 11/2008 | |
| JP | 2011009435 A | * | 1/2011 | H01G 2/065 |
| JP | 2016-139787 A | | 8/2016 | |
| JP | 2016143882 A | * | 8/2016 | H01G 2/065 |
| JP | 2018-510507 A | | 4/2018 | |
| KR | 20100066080 A | * | 6/2010 | |
| KR | 10-2010-0104894 A | | 9/2010 | |
| KR | 20170028610 A | * | 3/2017 | |
| KR | 20170080154 A | * | 7/2017 | |
| WO | 2017/100073 A1 | | 6/2017 | |

OTHER PUBLICATIONS

Official Communication issued in Korean Patent Application No. 10-2019-0074883, dated Jul. 16, 2020.

* cited by examiner

SECTION ALONG III-III

SECTION ALONG IV-IV

SECTION ALONG IX-IX $A = a + b + c$

MULTILAYER CERAMIC ELECTRONIC COMPONENT INCLUDING A PLURALITY OF BODIES AND METAL TERMINALS CONNECTED TO OUTER ELECTRODES

CROSS REFERENCE TO RELATED APPLICATIONS

This application claims the benefit of priority to Japanese Patent Application No. 2018-122293 filed on Jun. 27, 2018. The entire contents of this application are hereby incorporated herein by reference.

BACKGROUND OF THE INVENTION

1. Field of the Invention

The present invention relates to multilayer ceramic electronic components including metal terminals, and more particularly to a multilayer ceramic electronic component including, for example, a plurality of multilayer ceramic electronic component bodies located next to each other and two metal terminals connected to outer electrodes of the multilayer ceramic electronic component bodies.

2. Description of the Related Art

In recent years, inverter circuits suitable for achieving less energy consumption and higher efficiency have been used in consideration of environmental protection. With increasing working voltage, electronic components operable at higher voltages and currents have been desired.

When an electronic component, such as a multilayer ceramic capacitor, is operated at a high voltage, discharge between outer electrodes, that is, creeping discharge, easily occurs. Accordingly, there is an official standard that specifies a creeping distance for high-voltage inverter circuits.

Accordingly, film capacitors with which the creeping distance is able to be easily increased, as disclosed in Japanese Unexamined Patent Application Publications Nos. 2008-172050 and 2008-277505, and capacitors including metal terminals as disclosed in Japanese Unexamined Patent Application Publication No. 2000-235932 have come into widespread use as capacitors for high-voltage inverter circuits.

Although the film capacitors disclosed in Patent Application Publications No. 2008-172050 and Patent Application Publications No. 2008-277505 have sufficient creeping distances, the size thereof cannot be reduced for structural reasons. In addition, the film capacitors require lead terminals for structural reasons, and may only be mounted by inserting the lead terminals into a mounting board. Therefore, the film capacitors do not meet the recent market demands for smaller components that are surface-mountable without using lead wires.

The capacitor including metal terminals disclosed in Japanese Unexamined Patent Application Publication No. 2000-235932 does not have a sufficient creeping distance.

SUMMARY OF THE INVENTION

Accordingly, preferred embodiments of the present invention provide small surface-mountable multilayer ceramic electronic components with each of which creeping discharge is able to be reduced.

A multilayer ceramic electronic component according to a preferred embodiment of the present invention includes a plurality of multilayer ceramic electronic component bodies, a first metal terminal, and a second metal terminal. Each of the multilayer ceramic electronic component bodies includes a multilayer body including ceramic layers that are laminated, the multilayer body including a first principal surface and a second principal surface that are opposite to each other in a height direction, a first side surface and a second side surface that are opposite to each other in a width direction orthogonal or substantially orthogonal to the height direction, and a first end surface and a second end surface that are opposite to each other in a length direction orthogonal or substantially orthogonal to the height direction and the width direction; a first outer electrode provided on the first end surface, at least a portion of the first side surface, and at least a portion of the second side surface of the multilayer body; and a second outer electrode provided on the second end surface, at least a portion of the first side surface, and at least a portion of the second side surface of the multilayer body. The first metal terminal is connected to the first outer electrodes of the multilayer ceramic electronic component bodies. The second metal terminal is connected to the second outer electrodes of the multilayer ceramic electronic component bodies. A dimension t of each of the multilayer ceramic electronic component bodies in the height direction connecting the first principal surface and the second principal surface is less than a dimension w of each of the multilayer ceramic electronic component bodies in the width direction connecting the first side surface and the second side surface. Each of the multilayer ceramic electronic component bodies is positioned with one of the first and second side surfaces facing a mounting surface. The first metal terminal extends between the first outer electrodes of the multilayer ceramic electronic component bodies. The second metal terminal extends between the second outer electrodes of the multilayer ceramic electronic component bodies. The multilayer bodies, the first outer electrodes, and the second outer electrodes of the multilayer ceramic electronic component bodies, at least a portion of the first metal terminal, and at least a portion of the second metal terminal are covered by a cover material.

Preferred embodiments of the present invention provide small surface-mountable multilayer ceramic electronic components with each of which creeping discharge is able to be reduced.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Preferred embodiments of the present invention will be described in detail below with reference to the accompanying drawings.

1. Multilayer Ceramic Electronic Component

First Preferred Embodiment

Figure 1:
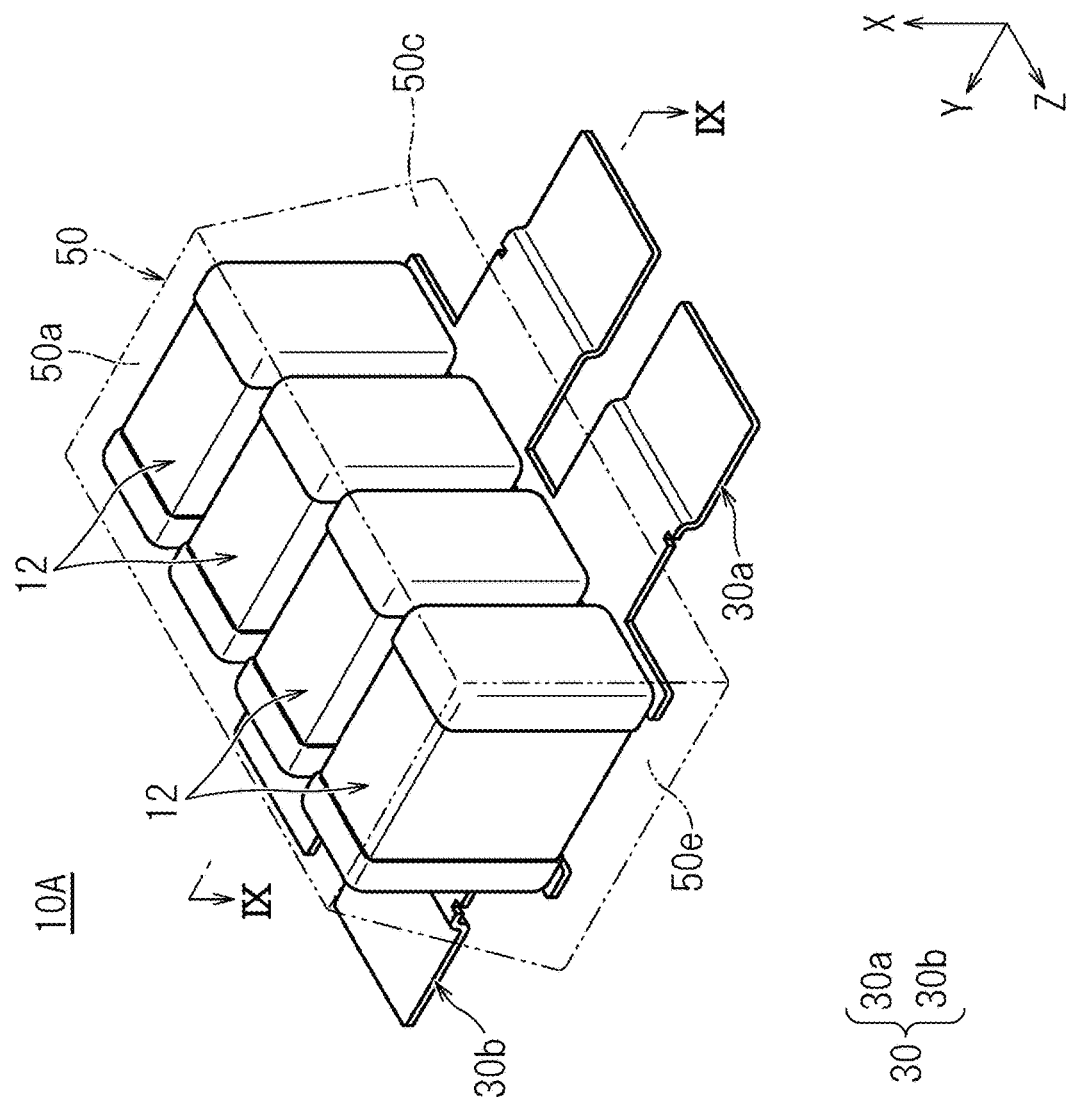
FIG. 1 is an external perspective view of an example of a multilayer ceramic electronic component according to a first preferred embodiment of the present invention.
Figure 2:
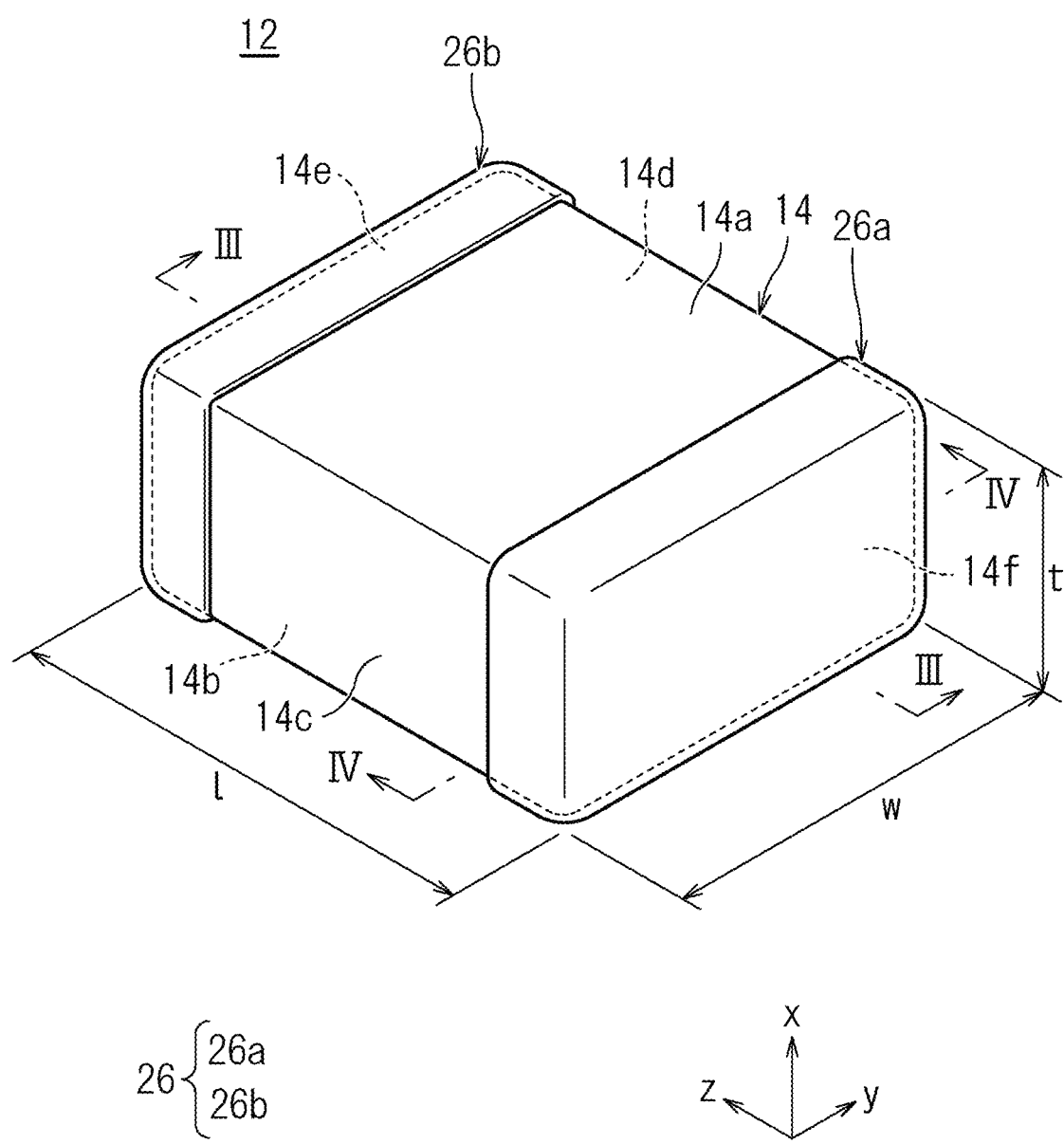
FIG. 2 is a perspective view illustrating the external shape of a multilayer ceramic electronic component body included in the multilayer ceramic electronic component illustrated in FIG. 1.
Figure 3:
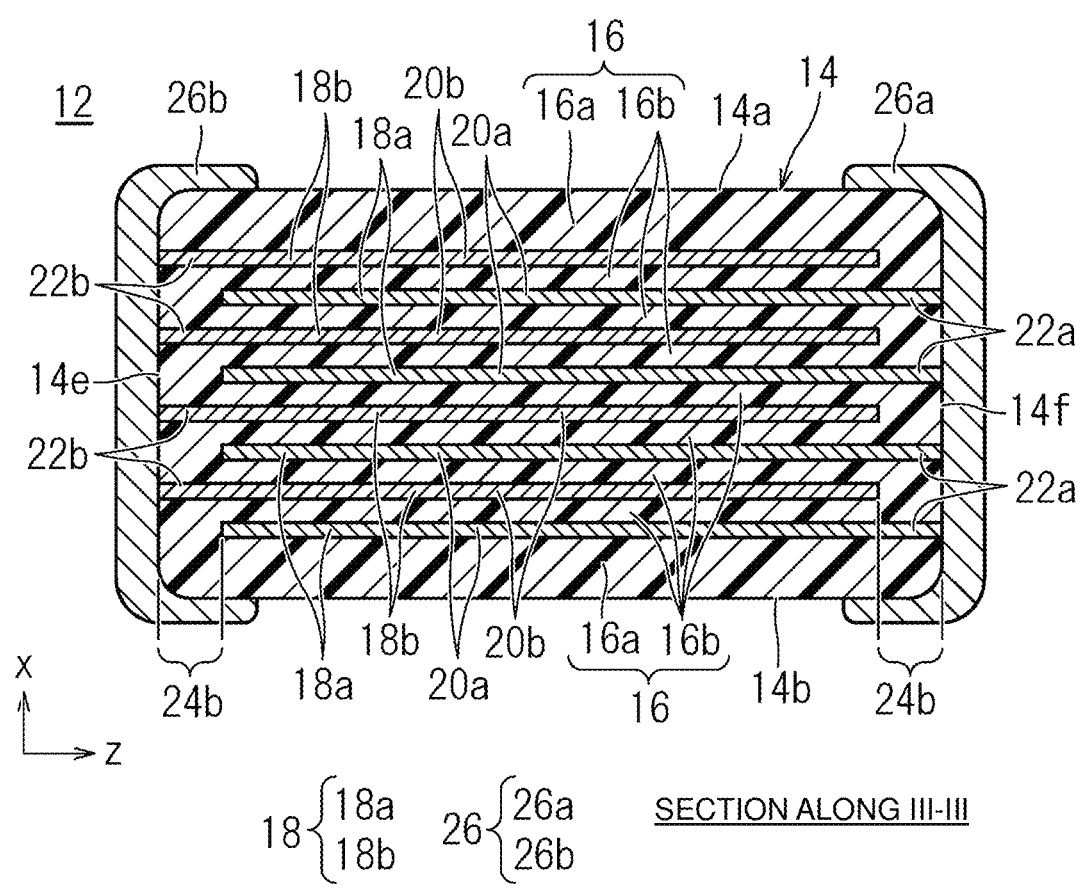
FIG. 3 is a sectional view of the multilayer ceramic electronic component body illustrated in FIG. 2 taken along line III-III.
Figure 4:
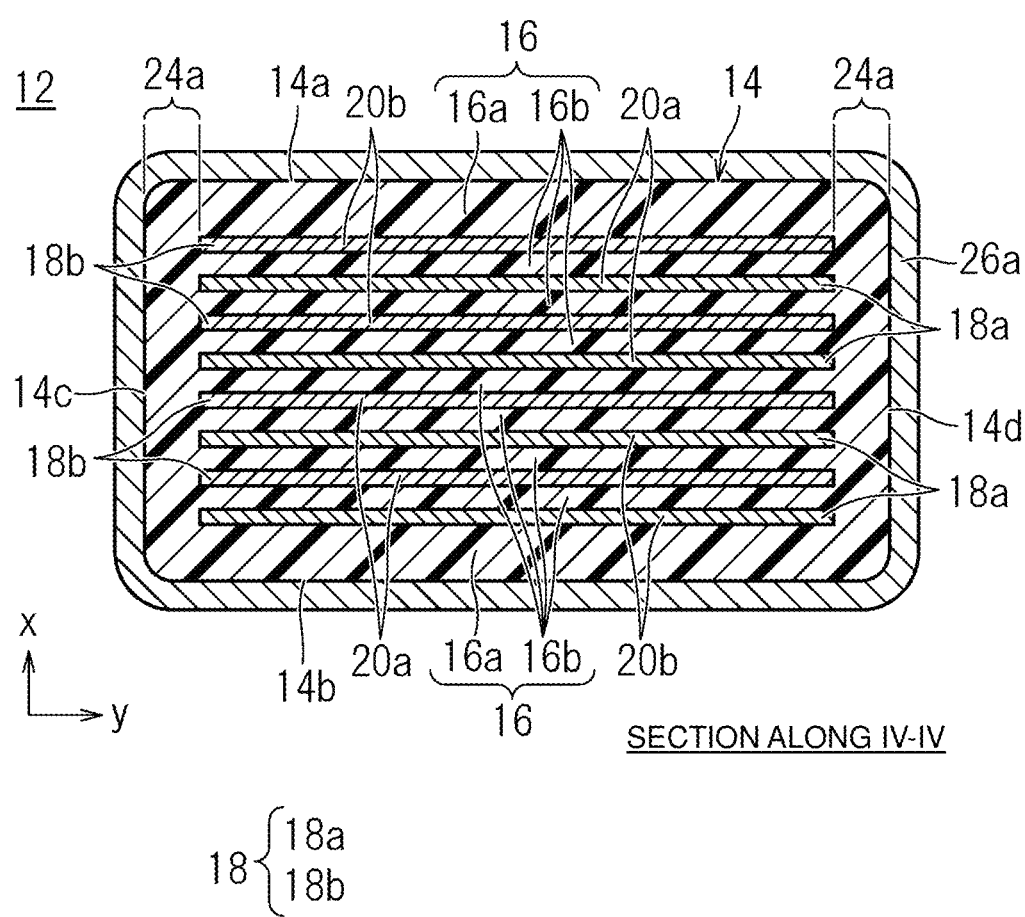
FIG. 4 is a sectional view of the multilayer ceramic electronic component body illustrated in FIG. 2 taken along line IV-IV.
Figure 5:
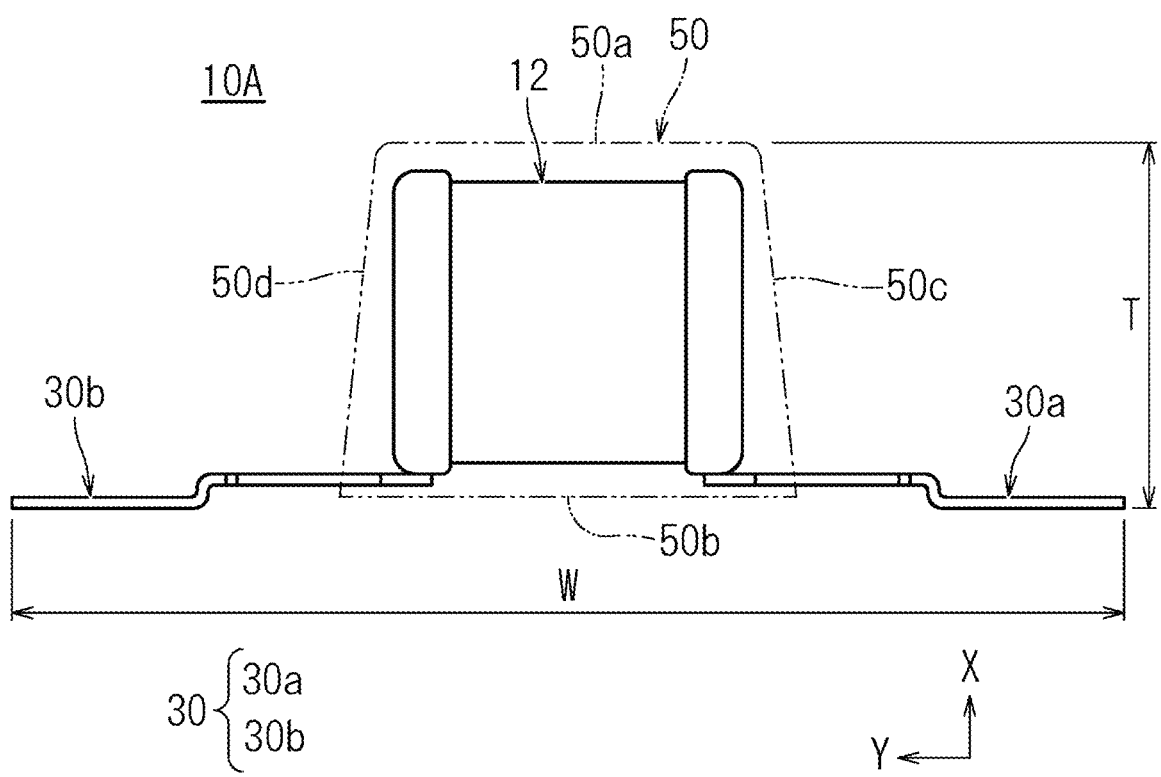
FIG. 5 is a front view of the multilayer ceramic electronic component according to the first preferred embodiment of the present invention illustrated in FIG. 1.
Figure 6:
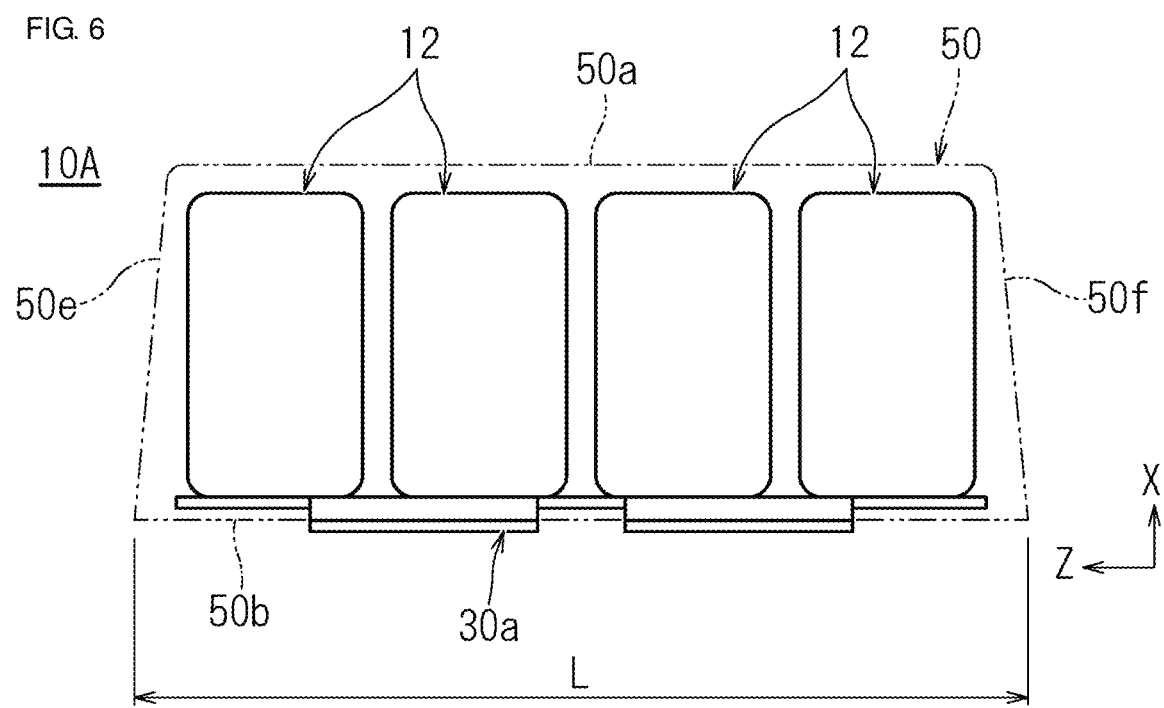
FIG. 6 is a side view of the multilayer ceramic electronic component according to the first preferred embodiment of the present invention illustrated in FIG. 1.
Figure 7:
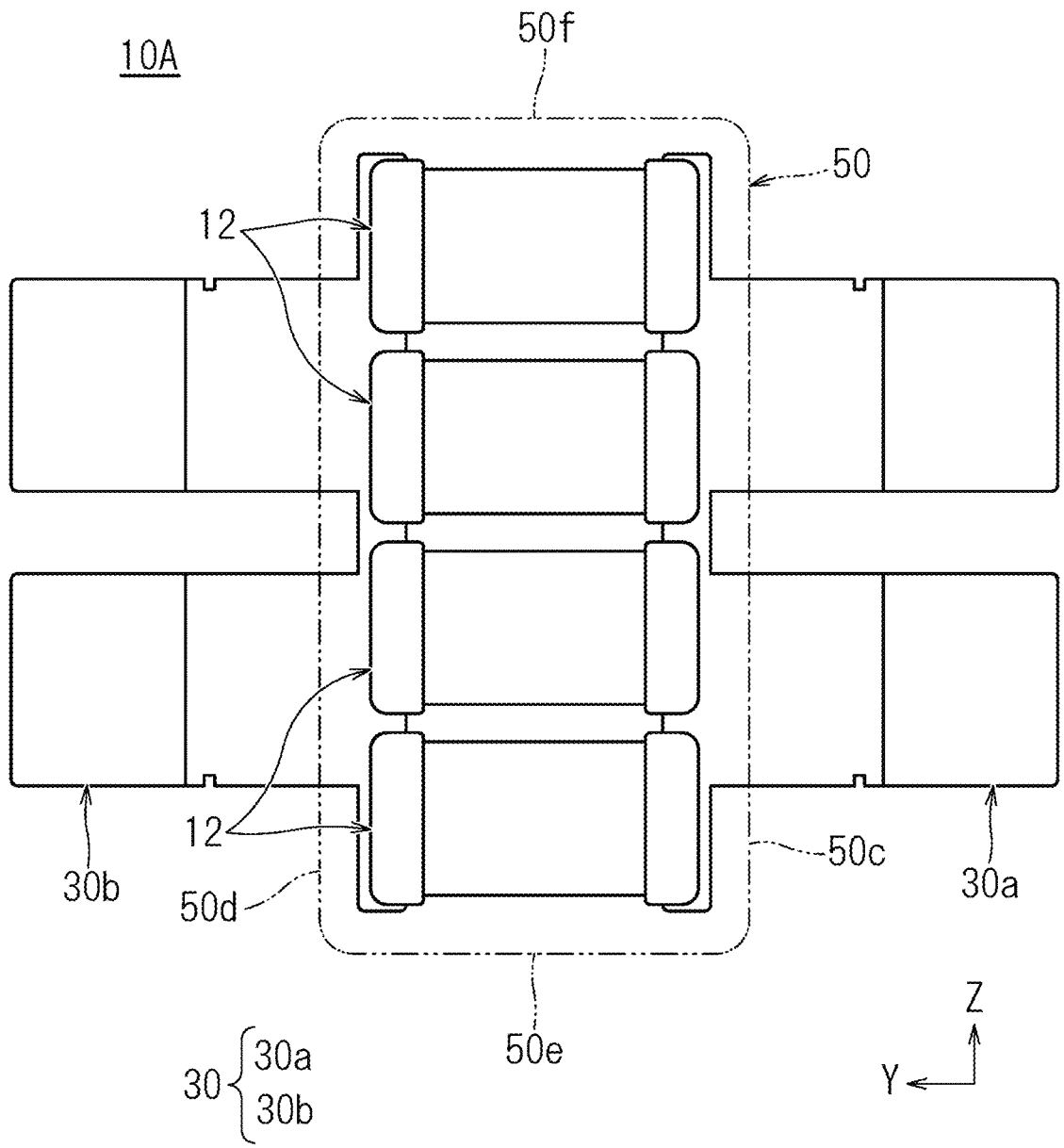
FIG. 7 is a top view of the multilayer ceramic electronic component according to the first preferred embodiment of the present invention illustrated in FIG. 1.
Figure 8:
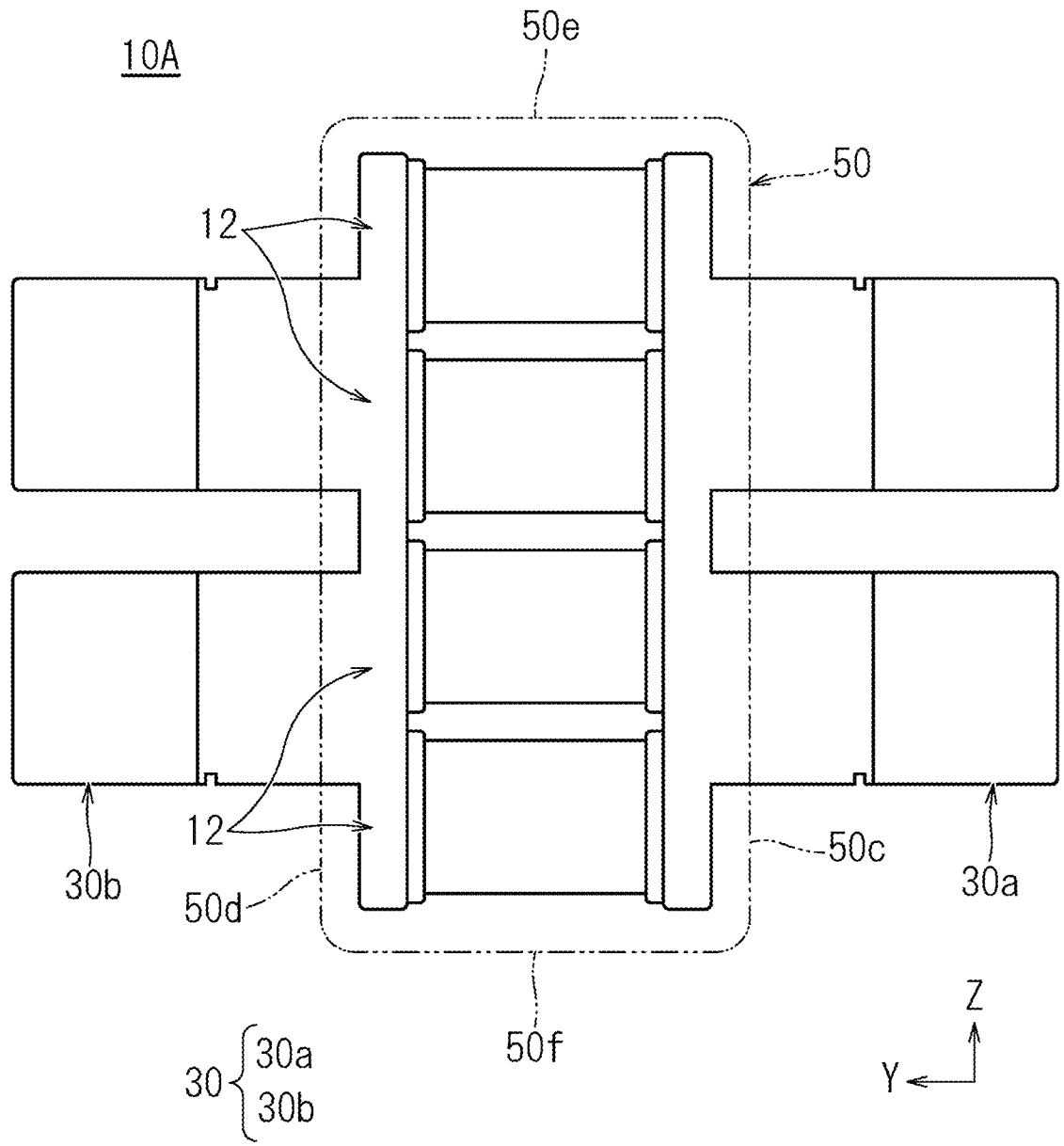
FIG. 8 is a bottom view of the multilayer ceramic electronic component according to the first preferred embodiment of the present invention illustrated in FIG. 1.
Figure 9:
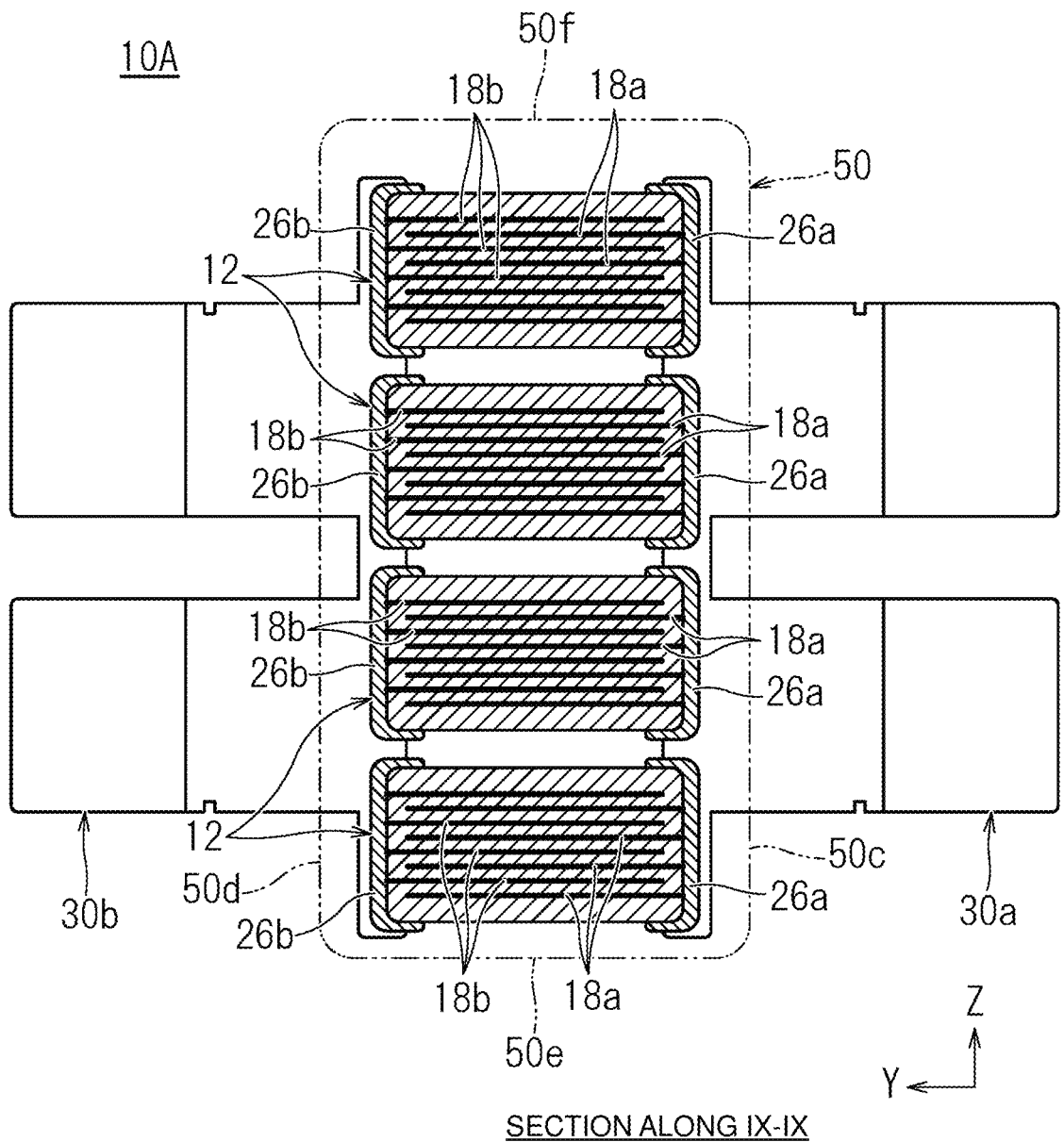
FIG. 9 is a sectional view of the multilayer ceramic electronic component illustrated in FIG. 1 taken along line IX-IX.
Figure 10:
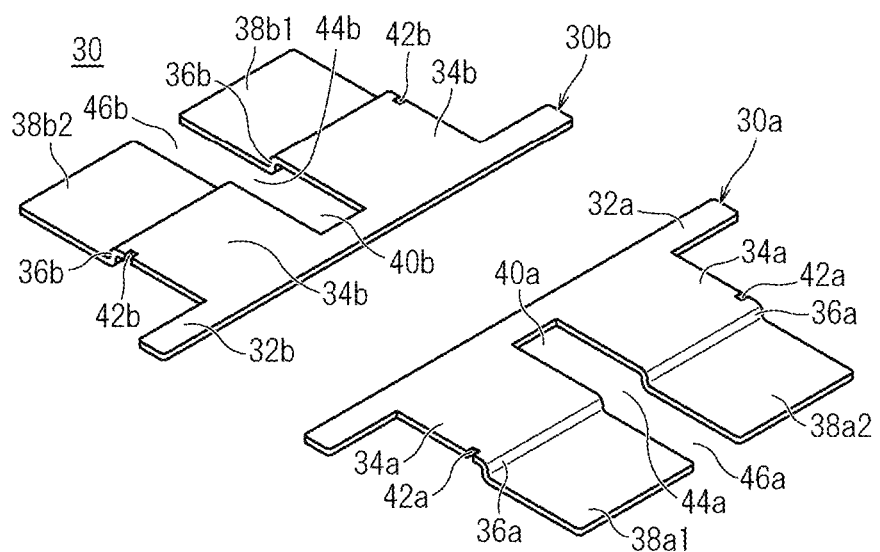
FIG. 10 is an external perspective view of metal terminals included in the multilayer ceramic electronic component according to the first preferred embodiment of the present invention.

A multilayer ceramic electronic component according to a first preferred embodiment of the present invention is described below with reference to the drawings. FIG. 1 is an external perspective view of an example of a multilayer ceramic electronic component according to a first preferred embodiment of the present invention. FIG. 2 is a perspective view illustrating the external shape of a multilayer ceramic electronic component body included in the multilayer ceramic electronic component illustrated in FIG. 1. FIG. 3 is a sectional view of the multilayer ceramic electronic component body illustrated in FIG. 2 taken along line III-III. FIG. 4 is a sectional view of the multilayer ceramic electronic component body illustrated in FIG. 2 taken along line IV-IV. FIG. 5 is a front view of the multilayer ceramic electronic component according to the first preferred embodiment of the present invention illustrated in FIG. 1. FIG. 6 is a side view of the multilayer ceramic electronic component according to the first preferred embodiment of the present invention illustrated in FIG. 1. FIG. 7 is a top view of the multilayer ceramic electronic component according to the first preferred embodiment of the present invention illustrated in FIG. 1. FIG. 8 is a bottom view of the multilayer ceramic electronic component according to the first preferred embodiment of the present invention illustrated in FIG. 1. FIG. 9 is a sectional view of the multilayer ceramic electronic component illustrated in FIG. 1 taken along line IX-IX. FIG. 10 is an external perspective view of metal terminals included in the multilayer ceramic electronic component according to the first preferred embodiment of the present invention.

(1) Multilayer Ceramic Electronic Component Body

A multilayer ceramic electronic component 10A according to the first preferred embodiment includes a plurality of multilayer ceramic electronic component bodies 12. Each multilayer ceramic electronic component body 12 includes a rectangular or substantially rectangular parallelepiped-shaped multilayer body 14 and outer electrodes 26. The multilayer ceramic electronic component 10A also includes metal terminals 30 connected to the outer electrodes 26 of the multilayer ceramic electronic component bodies 12 and a cover material 50 that covers the multilayer bodies 14 and the outer electrodes 26 of the multilayer ceramic electronic component bodies 12 and portions of the metal terminals 30.

Each multilayer body 14 includes a plurality of ceramic layers 16 that are laminated and a plurality of inner electrode layers 18 that are laminated. The multilayer body 14 includes a first principal surface 14a and a second principal surface 14b that are opposite to each other in a lamination direction x; a first side surface 14c and a second side surface 14d that are opposite to each other in a width direction y that is orthogonal or substantially orthogonal to the lamination direction x; and a first end surface 14e and a second end surface 14f that are opposite to each other in a length direction z that is orthogonal or substantially orthogonal to the lamination direction x and the width direction y. The multilayer body 14 includes rounded corner portions and rounded ridge portions.

The dimension of each multilayer ceramic electronic component body 12 including the multilayer body 14 and the outer electrodes 26 in the length direction z is defined as dimension 1. The dimension of each multilayer ceramic electronic component body 12 including the multilayer body 14 and the outer electrodes 26 in the lamination direction x is defined as dimension t. The dimension of each multilayer ceramic electronic component body 12 including the multilayer body 14 and the outer electrodes 26 in the width direction y is defined as dimension w.

The corner portions are portions at which three adjacent surfaces of the multilayer body 14 intersect. The ridge portions are portions at which two adjacent surfaces of the multilayer body 14 intersect. The first and second principal surfaces 14a and 14b, the first and second side surface 14c and 14d, and the first and second end surfaces 14e and 14f may each include irregularities over a partial area or the entire area thereof. The dimension t of each multilayer ceramic electronic component body 12 in the lamination direction x connecting the first and second principal surfaces 14a and 14b is less than the dimension w of each multilayer ceramic electronic component body 12 in the width direction y connecting the first and second side surfaces 14c and 14d.

Each multilayer ceramic electronic component body 12 is positioned with the first or second side surface 14c or 14d facing the mounting surface, that is, with the first or second side surface 14c or 14d, on which the inner electrode layers 18 face each other in a small area, facing the mounting surface. The mounting area is able to be reduced by arranging the multilayer ceramic electronic component bodies 12 with the surfaces that include a small area facing the mounting surface.

The number of ceramic layers 16 that are laminated together is not particularly limited, but is preferably in the range from about 300 to about 1200, for example.

The multilayer body 14 includes outer layer portions 16a which each include two or more of the ceramic layers 16 and an inner layer portion 16b including one or more of the ceramic layers 16 and the inner electrode layers 18 provided on the ceramic layers 16. The outer layer portions 16a are adjacent to or in a vicinity of the first and second principal surfaces 14a and 14b of the multilayer body 14, and are collections of the ceramic layers 16 located between the first principal surface 14a and the inner electrode layer 18 closest to the first principal surface 14a and the ceramic layers 16 located between the second principal surface 14b and the inner electrode layer 18 closest to the second principal surface 14b. The inner layer portion 16b is the region between the outer layer portions 16a.

The ceramic layers 16 may preferably include, for example, a dielectric material. The dielectric material may preferably be a dielectric ceramic containing, for example, $BaTiO_3$, $CaTiO_3$, $SrTiO_3$, or $CaZrO_3$. When the dielectric material is a main component, a sub-component, such as, for example, a Mn compound, a Fe compound, a Cr compound, a Co compound, or a Ni compound, may preferably be added in accordance with the desired characteristics of the multilayer body 14. The content of the sub-component is less than that of the main component.

When the multilayer body 14 contains a piezoelectric ceramic material, each multilayer ceramic electronic component body 12 defines and functions as a ceramic piezoelectric element. The piezoelectric ceramic material may preferably be, for example, a lead zirconate titanate (PZT)-based ceramic material.

When the multilayer body 14 contains a semiconductor ceramic material, each multilayer ceramic electronic component body 12 defines and functions as a thermistor element. The semiconductor ceramic material may preferably be, for example, a spinel-based ceramic material.

When the multilayer body 14 contains a magnetic ceramic material, each multilayer ceramic electronic component body 12 defines and functions as an inductor element. When each multilayer ceramic electronic component body 12 defines and functions as an inductor element, the inner electrode layers 18 define a coil-shaped conductor. The magnetic ceramic material may preferably be, for example, a ferrite ceramic material.

The thickness of the ceramic layers 16 after a baking process is preferably in the range from about 0.5 μm to about 10.0 μm, for example.

The inner electrode layers 18 of the multilayer body 14 includes, for example, a plurality of rectangular or substantially rectangular first inner electrode layers 18a and a plurality of rectangular or substantially rectangular second inner electrode layers 18b. The first inner electrode layers 18a and the second inner electrode layers 18b are embedded in the multilayer body 14, and are alternately located at equal or substantially equal intervals in the lamination direction x of the multilayer body 14.

Each first inner electrode layer 18a includes a first facing electrode portion 20a that faces a corresponding one of the second inner electrode layers 18b and a first extended electrode portion 22a that is provided at one end of the first inner electrode layer 18a and extends from the first facing electrode portion 20a to the first end surface 14e of the multilayer body 14. The first extended electrode portion 22a includes an end portion that extends to and is exposed at the first end surface 14e.

Each second inner electrode layer 18b includes a second facing electrode portion 20b that faces a corresponding one of the first inner electrode layers 18a and a second extended electrode portion 22b that is provided at one end of the second inner electrode layer 18b and extends from the second facing electrode portion 20b to the second end surface 14f of the multilayer body 14. The second extended electrode portion 22b includes an end portion that extends to and is exposed at the second end surface 14f.

The multilayer body 14 includes side portions (W gaps) 24a between the first side surface 14c and one end of each of the first facing electrode portions 20a and the second facing electrode portions 20b in the width direction y and between the second side surface 14d and the other end of each of the first facing electrode portions 20a and the second facing electrode portions 20b in the width direction y. The multilayer body 14 also includes end portions (L gaps) 24b between the second end surface 14f and an end portion of each first inner electrode layer 18a that is opposite to the first extended electrode portion 22a and between the first end surface 14e and an end portion of each second inner electrode layer 18b that is opposite to the second extended electrode portion 22b.

The inner electrode layers 18 preferably contain an appropriate conductive material, for example, a metal such as Ni, Cu, Ag, Pd, or Au, or an alloy containing at least one of these metals, such as an Ag—Pd alloy.

The thickness of the inner electrode layers 18 is preferably in the range from about 0.2 μm to about 2.0 μm, for example.

The outer electrodes 26 are located on the first end surface 14e and the second end surface 14f of the multilayer body 14. The outer electrodes 26 include a first outer electrode 26a and a second outer electrode 26b.

The first outer electrode 26a is located on the first end surface 14e of the multilayer body 14, and extends from the first end surface 14e to partially cover the first principal surface 14a, the second principal surface 14b, the first side surface 14c, and the second side surface 14d. The first outer electrode 26a is electrically connected to the first extended electrode portions 22a of the first inner electrode layers 18a. The first outer electrode 26a may instead be provided only on the first end surface 14e of the multilayer body 14.

The second outer electrode 26b is located on the second end surface 14f of the multilayer body 14, and extends from the second end surface 14f to partially cover the first principal surface 14a, the second principal surface 14b, the first side surface 14c, and the second side surface 14d. The second outer electrode 26b is electrically connected to the second extended electrode portions 22b of the second inner electrode layers 18b. The second outer electrode 26b may instead be provided only on the second end surface 14f of the multilayer body 14.

The first facing electrode portions 20a of the first inner electrode layers 18a and the second facing electrode portions 20b of the second inner electrode layers 18b face each other with the ceramic layers 16 interposed therebetween in the multilayer body 14 to provide an electrostatic capacitance. Accordingly, an electrostatic capacitance is provided between the first outer electrode 26a connected to the first inner electrode layers 18a and the second outer electrode 26b connected to the second inner electrode layers 18b, and the characteristics of a capacitor are obtained.

Each outer electrode 26 includes an underlying electrode layer and a plating layer located in that order from the multilayer body 14. The underlying electrode layer includes at least one of a baked layer, a resin layer, and a thin film layer.

An example in which the underlying electrode layer includes a baked layer will now be described.

The baked layer contains glass and metal. The metal contained in the baked layer preferably includes, for example, at least one of Cu, Ni, Ag, Pd, an Ag—Pd alloy, and Au. The glass contained in the baked layer preferably includes, for example, at least one of B, Si, Ba, Mg, Al, and Li. A ceramic material of the same type as the material of the ceramic layers 16 may be included instead of the glass. The baked layer may include a plurality of layers. The baked layer is formed by applying conductive paste containing the glass and the metal to the multilayer body 14 and baking the conductive paste. The conductive paste may be baked together with the ceramic layers 16 and the inner electrode layers 18 or be baked after the ceramic layers 16 and the inner electrode layers 18. In the case in which the conductive paste is baked together with the inner electrode layers 18, a ceramic material of the same type as the material of the ceramic layers 16 is preferably included instead of the glass, for example.

The thickness of the baked layer in the underlying electrode layer on each of the first and second end surfaces 14e and 14f is preferably in the range from about 10 μm to about 30 μm at the center or approximate center thereof in the height direction, for example.

When the underlying electrode layer is provided on the first and second principal surfaces 14a and 14b and the first and second side surfaces 14c and 14d, the thickness of the baked layer in the underlying electrode layer on each of the first and second principal surfaces 14a and 14b and the first and second side surfaces 14c and 14d is preferably in the range from about 30 μm to about 50 μm at the center or approximate center thereof in the length direction z, for example.

An example in which the underlying electrode layer includes of a resin layer will now be described.

The resin layer may be included on the surface of the baked layer or be provided directly on the first end surface 14e or the second end surface 14f of the multilayer body 14 without providing the baked layer. The resin layer preferably contains conductive particles and a thermosetting resin. The resin layer may include a plurality of layers.

The thickness of the resin layer on each of the first and second end surfaces 14e and 14f is preferably in the range from, for example, about 10 μm to about 30 μm at the center or approximate center thereof in the height direction, for example.

When the resin layer is included on the first and second principal surfaces 14a and 14b and the first and second side surfaces 14c and 14d, the thickness of the resin layer on each of the first and second principal surfaces 14a and 14b and the first and second side surfaces 14c and 14d is preferably in the range from about 30 μm to about 50 μm at the center or approximate center thereof in the length direction z, for example.

When the underlying electrode layer is a thin film layer, the thin film layer is formed by a thin film forming method, such as sputtering or vapor deposition, and is includes of a layer formed by depositing metal particles preferably to a thickness of about 1 μm or less, for example.

The plating layer covers the underlying electrode layer. The plating layer preferably contains, for example, at least one of Cu, Ni, Sn, Ag, Pd, an Ag—Pd alloy, and Au. The plating layer may include a plurality of layers. In such a case, the plating layer preferably includes a two-layer structure including a Ni plating layer and a Sn plating layer, for example. In the case in which the Ni plating layer is provided to cover the surface of the underlying electrode layer, erosion of the underlying electrode layer by solder is able to be significantly reduced or prevented when each multilayer ceramic electronic component body 12 is soldered to the metal terminals 30. In the case in which the Sn plating layer is provided on the surface of the Ni plating layer, solder wettability is able to be increased when each multilayer ceramic electronic component body 12 is soldered to the metal terminals 30, so that the mounting process is able to be facilitated.

The thickness of each layer of the plating layer is preferably in the range from about 1 μm to about 15 μm, for example.

The thickness of the plating layer on the first and second end surfaces 14e and 14f is preferably in the range from, for example, about 1 µm to about 15 µm at the center or approximate center thereof in the height direction.

When the plating layer is provided on the first and second principal surfaces 14a and 14b and the first and second side surfaces 14c and 14d, the thickness of the plating layer on each of the first and second principal surfaces 14a and 14b and the first and second side surfaces 14c and 14d is preferably in the range from about 1 µm to about 15 µm at the center or approximate center thereof in the length direction z, for example.

The underlying electrode layer may be omitted, and each outer electrode 26 may include only the plating layer. A structure in which the underlying electrode layer is not provided and the plating layer is provided will now be described.

Each of the first outer electrode 26a and the second outer electrode 26b may include no underlying electrode layer and include a plating layer located directly on the surface of the multilayer body 14. In other words, each multilayer ceramic electronic component body 12 may include plating layers that are electrically connected to the first inner electrode layers 18a or the second inner electrode layers 18b. In this case, the plating layers may be formed after applying catalyst to the surfaces of the multilayer body 14 as pretreatment.

Each plating layer preferably includes a lower plating electrode provided on the surface of the multilayer body 14 and an upper plating electrode provided on the surface of the lower plating electrode, for example.

Each of the lower plating electrode and the upper plating electrode preferably includes at least one metal selected from Cu, Ni, Sn, Pb, Au, Ag, Pd, Bi, and Zn or an alloy containing the metal, for example.

The lower plating electrode is preferably made of, for example, Ni, which defines and functions as a solder barrier, and the upper plating electrode is preferably made of, for example, Sn or Au, which have high solder wettability. When, for example, the first inner electrode layers 18a and the second inner electrode layers 18b are made of Ni, the lower plating electrode preferably includes, for example, Cu, which is easily bondable to Ni. The upper plating electrode may be included, and each of the first outer electrode 26a and the second outer electrode 26b may include only the lower plating electrode.

The upper plating electrode of the plating layer may be the outermost layer. Alternatively, another plating electrode may be additionally provided on the surface of the upper plating electrode.

When no underlying electrode layer is provided, the thickness of each layer of the plating layer is preferably in the range from about 1 µm to about 15 µm, for example. The plating layer preferably contains no glass, for example, and the content of metal per unit volume of the plating layer is preferably greater than or equal to about 99 vol %, for example.

The multilayer ceramic electronic component bodies 12 included in the multilayer ceramic electronic component 10A are located with the principal surfaces thereof facing each other. The direction connecting the first principal surface 14a and the second principal surface 14b of each multilayer ceramic electronic component body 12 is defined as a length direction Z of the multilayer ceramic electronic component 10A. The direction connecting the first end surface 14e and the second end surface 14f of each multilayer ceramic electronic component body 12 is defined as a width direction Y of the multilayer ceramic electronic component 10A. The direction connecting the first side surface 14c and the second side surface 14d of each multilayer ceramic electronic component body 12 is defined as a height direction X of the multilayer ceramic electronic component 10A.

The cover material 50, which will be described below, includes a first principal surface 50a and a second principal surface 50b that are respectively adjacent to or in a vicinity of the first side surface 14c and the second side surface 14d of each multilayer ceramic electronic component body 12; a first side surface 50c and a second side surface 50d that are respectively adjacent to or in a vicinity of the first end surface 14e and the second end surface 14f of each multilayer ceramic electronic component body 12; and a first end surface 50e and a second end surface 50f that are respectively adjacent to or in a vicinity of the first principal surface 14a and the second principal surface 14b of each multilayer ceramic electronic component body 12.

(2) Metal Terminals

The metal terminals 30 are connected to the outer electrodes 26 on both end surfaces of the multilayer ceramic electronic component bodies 12. In the present preferred embodiment, four multilayer ceramic electronic component bodies 12 are provided.

The metal terminals 30 include a first metal terminal 30a and a second metal terminal 30b.

The first metal terminal 30a is connected to the first outer electrode 26a of each multilayer ceramic electronic component body 12 by a joining material. More specifically, the first metal terminal 30a is connected to the first outer electrode 26a on the first or second side surface 14c or 14d of each multilayer ceramic electronic component body 12.

The second metal terminal 30b is connected to the second outer electrode 26b of each multilayer ceramic electronic component body 12 by a joining material. More specifically, the second metal terminal 30b is connected to the second outer electrode 26b on the first or second side surface 14c or 14d of each multilayer ceramic electronic component body 12.

The metal terminals 30 are provided to enable surface mounting of the multilayer ceramic electronic component bodies 12 to a mounting board. The metal terminals 30 may preferably be, for example, plate-shaped lead frames. Each of the metal terminals 30 with plate-shaped lead frames includes a first principal surface that is connected to corresponding ones of the outer electrodes 26, a second principal surface that is opposite to the first principal surface (that faces away from the multilayer ceramic electronic component bodies 12), and a surrounding surface that defines the thickness between the first principal surface and the second principal surface.

The first metal terminal 30a includes a first terminal joining portion 32a that is connected to the first outer electrodes 26a; a first extending portion 34a that is connected to the first terminal joining portion 32a and extends in a direction parallel or substantially parallel to the first side surfaces 14c (side surfaces facing the mounting surface) and that is spaced away from the first side surfaces 14c (side surfaces facing the mounting surface) and the mounting surface; a second extending portion 36a that is connected to the first extending portion 34a and extends toward the mounting surface positioned opposite the multilayer ceramic electronic component bodies 12; and a first mounting portion 38a that is connected to the second extending portion 36a and mounted on the mounting board. The structure of the extending portions is not limited to the above-described structure, and a curved extending portion may be additionally provided.

The second metal terminal 30b includes a second terminal joining portion 32b that is connected to the second outer electrodes 26b; a third extending portion 34b that is connected to the second terminal joining portion 32b and extends in a direction parallel or substantially parallel to the first side surfaces 14c (side surfaces facing the mounting surface) and that is spaced away from the first side surfaces 14c (side surfaces facing the mounting surface) and the mounting surface; a fourth extending portion 36b that is connected to the third extending portion 34b and extends toward the mounting surface positioned opposite the multilayer ceramic electronic component bodies 12; and a second mounting portion 38b that is connected to the fourth extending portion 36b and mounted on the mounting board. The structure of the extending portions is not limited to the above-described structure, and a curved extending portion may be additionally provided.

(a) First Terminal Joining Portion and Second Terminal Joining Portion

The first terminal joining portion 32a of the first metal terminal 30a is joined to the first outer electrode 26a on the first side surface 14c (side surface facing the mounting surface) of each multilayer ceramic electronic component body 12. The first terminal joining portion 32a is continuously connected to the first outer electrodes 26a of the multilayer ceramic electronic component bodies 12. The shape of the first terminal joining portion 32a is not particularly limited, and may preferably be a rectangular or substantially rectangular shape with the first terminal joining portion 32a continuously connectable to the first outer electrodes 26a of the multilayer ceramic electronic component bodies 12.

The second terminal joining portion 32b of the second metal terminal 30b is joined to the second outer electrode 26b on the first side surface 14c (side surface facing the mounting surface) of each multilayer ceramic electronic component body 12. The second terminal joining portion 32b is continuously connected to the second outer electrodes 26b of the multilayer ceramic electronic component bodies 12. The shape of the second terminal joining portion 32b is not particularly limited, and may preferably be a rectangular or substantially rectangular shape with the second terminal joining portion 32b continuously connectable to the second outer electrodes 26b of the multilayer ceramic electronic component bodies 12.

Referring to FIGS. 1 and 10, when the first terminal joining portion 32a has a rectangular or substantially rectangular shape with the first terminal joining portion 32a continuously connectable to the first outer electrodes 26a of the multilayer ceramic electronic component bodies 12, the first terminal joining portion 32a of the first metal terminal 30a, in the length direction Z of the multilayer ceramic electronic component 10A, preferably entirely or substantially entirely covers the first outer electrodes 26a on the first side surfaces 14c (side surfaces facing the mounting surface) of the multilayer ceramic electronic component bodies 12 in the lamination direction x, for example. More specifically, the first terminal joining portion 32a is provided as a single joining portion that continuously covers the first outer electrodes 26a on the first side surfaces 14c (side surfaces facing the mounting surface) of all of the multilayer ceramic electronic component bodies 12 from the multilayer ceramic electronic component body 12 closest to the first end surface 50e of the multilayer ceramic electronic component 10A to the multilayer ceramic electronic component body 12 closest to the second end surface 50f of the multilayer ceramic electronic component 10A. Thus, the first terminal joining portion 32a continuously extends over a region including the gaps between the multilayer ceramic electronic component bodies 12.

When the second terminal joining portion 32b has a rectangular or substantially rectangular shape with the second terminal joining portion 32b continuously connectable to the second outer electrodes 26b of the multilayer ceramic electronic component bodies 12, the second terminal joining portion 32b of the second metal terminal 30b, in the length direction Z of the multilayer ceramic electronic component 10A, preferably entirely or substantially entirely covers the second outer electrodes 26b on the first side surfaces 14c (side surfaces facing the mounting surface) of the multilayer ceramic electronic component bodies 12 in the lamination direction x, for example. More specifically, the second terminal joining portion 32b is provided as a single joining portion that continuously covers the second outer electrodes 26b on the first side surfaces 14c (side surfaces facing the mounting surface) of all of the multilayer ceramic electronic component bodies 12 from the multilayer ceramic electronic component body 12 closest to the first end surface 50e of the multilayer ceramic electronic component 10A to the multilayer ceramic electronic component body 12 closest to the second end surface 50f of the multilayer ceramic electronic component 10A. Thus, the second terminal joining portion 32b continuously extends over a region including the gaps between the multilayer ceramic electronic component bodies 12.

One end of the first terminal joining portion 32a of the first metal terminal 30a near one of the multilayer ceramic electronic component bodies 12 that is closest to the first end surface 50e of the multilayer ceramic electronic component 10A preferably protrudes by a distance in the range from about 0.05 mm to about 0.25 mm, for example, from the edge of the first outer electrode 26a on the first side surface 14c (side surface facing the mounting surface) of the multilayer ceramic electronic component body 12 closest to the first end surface 50e of the multilayer ceramic electronic component 10A. In such a case, the multilayer ceramic electronic component bodies 12 may be in contact with the metal terminals 30 in equal or substantially equal areas, and the joining strength and the resistance of the metal terminals 30 may be adjusted within certain ranges.

Similarly, the other end of the first terminal joining portion 32a of the first metal terminal 30a near one of the multilayer ceramic electronic component bodies 12 that is closest to the second end surface 50f of the multilayer ceramic electronic component 10A preferably protrudes by a distance in the range from about 0.05 mm to about 0.25 mm, for example, from the edge of the first outer electrode 26a on the first side surface 14c (side surface facing the mounting surface) of the multilayer ceramic electronic component body 12 closest to the second end surface 50f of the multilayer ceramic electronic component 10A. In such a case, the multilayer ceramic electronic component bodies 12 may be in contact with the metal terminals 30 in equal or substantially equal areas, and the joining strength and the resistance of the metal terminals 30 may be adjusted within certain ranges.

One end of the second terminal joining portion 32b of the second metal terminal 30b near one of the multilayer ceramic electronic component bodies 12 that is closest to the first end surface 50e of the multilayer ceramic electronic component 10A preferably protrudes by a distance in the range from about 0.05 mm to about 0.25 mm, for example, from the edge of the second outer electrode 26b on the first side surface 14c (side surface facing the mounting surface) of the multilayer ceramic electronic component body 12 closest to the first end surface 50e of the multilayer ceramic electronic component 10A. In such a case, the multilayer ceramic electronic component bodies 12 may be in contact with the metal terminals 30 in equal or substantially equal areas, and the joining strength and the resistance of the metal terminals 30 may be adjusted within certain ranges.

Similarly, the other end of the second terminal joining portion 32b of the second metal terminal 30b near one of the multilayer ceramic electronic component bodies 12 that is closest to the second end surface 50f of the multilayer ceramic electronic component 10A preferably protrudes by a distance in the range from about 0.05 mm to about 0.25 mm, for example, from the edge of the second outer electrode 26b on the first side surface 14c (side surface facing the mounting surface) of the multilayer ceramic electronic component body 12 closest to the second end surface 50f of the multilayer ceramic electronic component 10A. In such a case, the multilayer ceramic electronic component bodies 12 may be in contact with the metal terminals 30 in equal or substantially equal areas, and the joining strength and the resistance of the metal terminals 30 may be adjusted within certain ranges.

The length of the first terminal joining portion 32a of the first metal terminal 30a in the width direction Y of the multilayer ceramic electronic component 10A is preferably equivalent to or less than the length of the first outer electrode 26a on the first side surface 14c (side surface facing the mounting surface) of each multilayer ceramic electronic component body 12 in the length direction z connecting the first end surface 14e and the second end surface 14f, for example. For example, when the width of the first terminal joining portion 32a is about 0.78±0.15 mm, the length of the first outer electrode 26a in the length direction z connecting the first end surface 14e and the second end surface 14f is preferably about 1.0±0.3 mm.

When the length of the first terminal joining portion 32a of the first metal terminal 30a in the width direction Y of the multilayer ceramic electronic component 10A is less than the length of the first outer electrode 26a on the first side surface 14c (side surface facing the mounting surface) of each multilayer ceramic electronic component body 12 in the length direction z connecting the first end surface 14e and the second end surface 14f, the length of the first terminal joining portion 32a of the first metal terminal 30a in the width direction Y of the multilayer ceramic electronic component 10A is preferably in the range from about 60% to about 90%, for example, of the length of the first outer electrode 26a on the first side surface 14c (side surface facing the mounting surface) of each multilayer ceramic electronic component body 12 in the length direction z connecting the first end surface 14e and the second end surface 14f. In such a case, the amount of solder that flows into the space below each multilayer ceramic electronic component 12 is able to be controlled, and the amount of residual flux in the solder is able to be reduced. As a result, erosion of the underlying electrode layer by the flux is able to be reduced, and reduction in moisture resistance of the multilayer ceramic electronic component 10A is able to be significantly reduced or prevented.

The length of the second terminal joining portion 32b of the second metal terminal 30b in the width direction Y of the multilayer ceramic electronic component 10A is preferably, for example, equivalent to or less than the length of the second outer electrode 26b on the first side surface 14c (side surface facing the mounting surface) of each multilayer ceramic electronic component body 12 in the length direction z connecting the first end surface 14e and the second end surface 14f. For example, when the width of the second terminal joining portion 32b is about 0.78±0.15 mm, the length of the second outer electrode 26b in the length direction z connecting the first end surface 14e and the second end surface 14f is preferably about 1.0±0.3 mm.

When the length of the second terminal joining portion 32b of the second metal terminal 30b in the width direction Y of the multilayer ceramic electronic component 10A is less than the length of the second outer electrode 26b on the first side surface 14c (side surface facing the mounting surface) of each multilayer ceramic electronic component body 12 in the length direction z connecting the first end surface 14e and the second end surface 14f, the length of the second terminal joining portion 32b of the second metal terminal 30b in the width direction Y of the multilayer ceramic electronic component 10A is preferably in the range from about 60% to about 90%, for example, of the length of the second outer electrode 26b on the first side surface 14c (side surface facing the mounting surface) of each multilayer ceramic electronic component body 12 in the length direction z connecting the first end surface 14e and the second end surface 14f. In such a case, the amount of solder that flows into the space below each multilayer ceramic electronic component 12 is able to be controlled, and the amount of residual flux in the solder is able to be reduced. As a result, erosion of the underlying electrode layer by the flux is able to be reduced, and reduction in moisture resistance of the multilayer ceramic electronic component 10A is able to be significantly reduced or prevented.

(b) First Extending Portion and Third Extending Portion

The first extending portion 34a of the first metal terminal 30a is connected to the first terminal joining portion 32a and extends away from each multilayer ceramic electronic component body 12 in a direction substantially parallel to the first or second side surface 14c or 14d (side surface facing the mounting surface). Accordingly, the length of a portion molded by the cover material 50 is able to be increased. As a result, a sufficient insulating surface distance (creeping distance) is able to be provided between the conductors. In addition, a sufficient bending margin is able to be provided when the terminal is bent.

The length of the first extending portion 34a of the first metal terminal 30a in the length direction Z of the multilayer ceramic electronic component 10A is preferably shorter than the length of the first terminal joining portion 32a in the length direction Z of the multilayer ceramic electronic component 10A, for example. More specifically, the length of the first extending portion 34a is preferably in the range from about 50% to about 90%, for example, of the length of the first terminal joining portion 32a in the length direction Z of the multilayer ceramic electronic component 10A. Accordingly, a resin inlet used to form the cover material 50 by molding may be provided in a lower section, and the resin fluidity is able to be optimized. In addition, the amount of material of the metal terminals is able to be reduced, so that the cost is able to be reduced. The length of the first extending portion 34a of the first metal terminal 30a in the length direction Z of the multilayer ceramic electronic component 10A may instead be equal or substantially equal to that of the first terminal joining portion 32a, or be reduced stepwise or in a tapered shape.

The length of the first extending portion 34a in the width direction Y of the multilayer ceramic electronic component 10A is not particularly limited, but is preferably in the range from about 3 mm to about 5 mm, for example. In such a case, the length of a portion molded by the cover material 50 is able to be increased. As a result, a sufficient insulating surface distance (creeping distance) is able to be provided between the conductors. In addition, a sufficient bending margin is able to be provided when the terminal is bent.

Figure 28A:
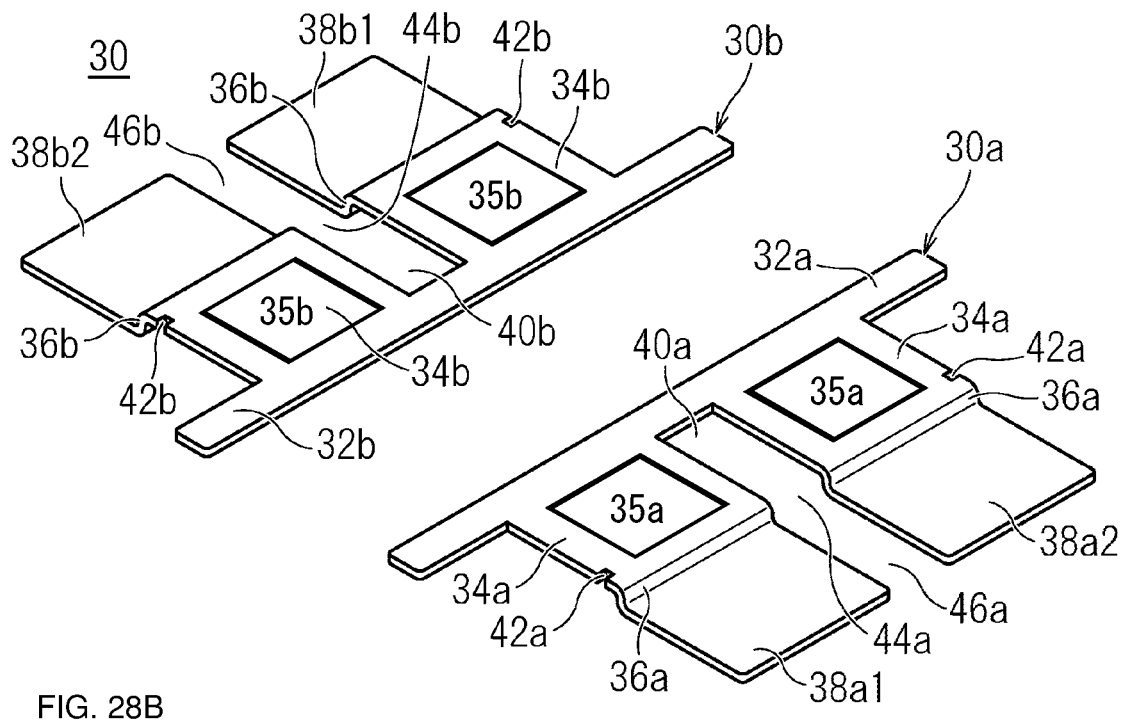
FIG. 28A is an external perspective view of metal terminals included in a multilayer ceramic electronic component according to a preferred embodiment of the present invention.
Figure 28B:
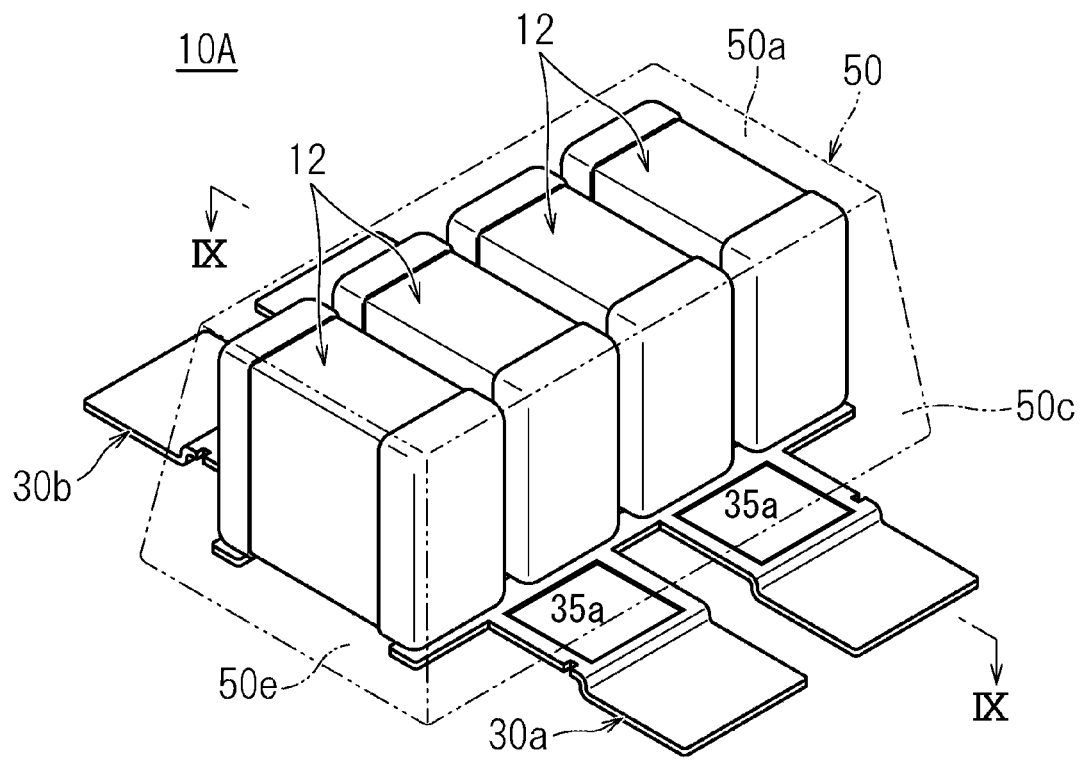
FIG. 28B is an external perspective view of an example of a multilayer ceramic electronic component according to a preferred embodiment of the present invention.

As shown in FIGS. 28A and 28B, the first extending portion 34a may include a portion 35a whose surface is processed into a recessed shape so that the base material of the first metal terminal 30a is exposed at the processed portion 35a. Accordingly, even if the joining material in the joined section is melted, solder leakage is able to be significantly reduced or prevented because the wettability for the joining material is reduced at the processed portion 35a having a recessed shape at which the base material of the first metal terminal 30a is exposed. Thus, the melted joining material does not easily flow out of the cover material 50.

As illustrated in FIG. 10, the first extending portion 34a may also include a first cut portion 40a. In such a case, the amount of material of the metal terminals is able to be reduced, so that the cost is able to be reduced. In addition, the stress applied by the mounting board after the mounting process is able to be reduced.

The third extending portion 34b of the second metal terminal 30b is connected to the second terminal joining portion 32b and extends away from each multilayer ceramic electronic component body 12 in a direction substantially parallel to the first or second side surface 14c or 14d (side surface facing the mounting surface). Accordingly, the length of the portion molded by the cover material 50 is able to be increased. As a result, a sufficient insulating surface distance (creeping distance) is able to be provided between the conductors. In addition, a sufficient bending margin is able to be provided when the terminal is bent.

The length of the third extending portion 34b of the second metal terminal 30b in the length direction Z of the multilayer ceramic electronic component 10A is preferably shorter than the length of the second terminal joining portion 32b in the length direction Z of the multilayer ceramic electronic component 10A, for example. More specifically, the length of the third extending portion 34b is preferably in the range from about 50% to about 90% of the length of the second terminal joining portion 32b in the length direction Z of the multilayer ceramic electronic component 10A, for example. Accordingly, a resin inlet used to form the cover material 50 by molding may be provided in a lower section, and the resin fluidity is able to be optimized. In addition, the amount of material of the metal terminals is able to be reduced, so that the cost is able to be reduced. The length of the third extending portion 34b of the second metal terminal 30b in the length direction Z of the multilayer ceramic electronic component 10A may instead be equal or substantially equal to that of the first terminal joining portion 32a, or be reduced stepwise or in a tapered shape.

The length of the third extending portion 34b in the width direction Y of the multilayer ceramic electronic component 10A is not particularly limited, but is preferably in the range from about 3 mm to about 5 mm, for example. In such a case, the length of a portion molded by the cover material 50 is able to be increased. As a result, a sufficient insulating surface distance (creeping distance) is able to be provided between the conductors. In addition, a sufficient bending margin is able to be provided when the terminal is bent.

As shown in FIG. 28A, the third extending portion 34b may include a portion 35b whose surface is processed into a recessed shape so that the base material of the second metal terminal 30b is exposed at the processed portion 35b. Accordingly, even if the joining material in the joined section is melted, solder leakage is able to be significantly reduced or prevented because the wettability for the joining material is reduced at the processed portion 35b having a recessed shape at which the base material of the second metal terminal 30b is exposed. Thus, the melted joining material does not easily flow out of the cover material 50.

As illustrated in FIG. 10, the third extending portion 34b may also include a fourth cut portion 40b. In such a case, the amount of material of the metal terminals is able to be reduced, so that the cost is able to be reduced. In addition, the stress applied by the mounting board after the mounting process is able to be reduced.

(c) Second Extending Portion and Fourth Extending Portion

The second extending portion 36a of the first metal terminal 30a is connected to the first extending portion 34a and extends toward the mounting surface to provide a gap between the first or second side surface 14c or 14d that faces the mounting surface and the mounting surface. This arrangement increases the distance from the mounting board and reduces the stress applied by the mounting board. In addition, the thickness of a lower portion of the cover material 50 is able to be increased to provide increased insulation. More specifically, the second extending portion 36a extends from an end of the first extending portion 34a and is curved toward the mounting surface. The curved portion may be curved either at an obtuse angle or at a right or substantially right angle.

The length of the second extending portion 36a of the first metal terminal 30a in the length direction Z of the multilayer ceramic electronic component 10A is not particularly limited, but is preferably equal or substantially equal to the length of the first extending portion 34a in the length direction Z of the multilayer ceramic electronic component 10A, for example.

The distance by which the second extending portion 36a extends toward the mounting surface is preferably set so that the gap between the surface of the cover material 50 (described below) that faces the mounting surface and the mounting surface is in the range from about 0.15 mm to about 2 mm, for example. Since the multilayer ceramic electronic component bodies 12 covered by the cover material 50 are raised above the mounting surface, the distance from the mounting board is increased, and the effect of reducing the stress applied by the mounting board is enhanced. In addition, the thickness of a lower portion of the cover material 50 is able to be increased to provide increased insulation.

Similar to the first extending portion 34a, the second extending portion 36a may include a portion whose surface is processed into a recessed shape so that the base material of the first metal terminal 30a is exposed at the processed portion. Accordingly, even if the joining material in the joined section is melted, solder leakage is able to be significantly reduced or prevented because the wettability for the solder is reduced at the processed portion having a recessed shape at which the base material of the first metal terminal 30a is exposed. Thus, the melted solder does not easily flow out of the cover material 50.

As illustrated in FIG. 10, the second extending portion 36a includes a second cut portion 44a at the center or approximate center thereof so that the second extending portion 36a is divided into two portions. Thus, the stress applied by the mounting board after the mounting process is able to be reduced. The second extending portion 36a may instead be divided into three or more portions, or include no second cut portion 44a.

The second extending portion 36a may include bending cut portions 42a that differ from the above-described cut portion in both end portions thereof in the length direction Z of the multilayer ceramic electronic component 10A. The bending cut portions 42a receive the material of the first metal terminal 30a when the first metal terminal 30a is bent, thus increasing the bendability of the first metal terminal 30a.

The fourth extending portion 36b of the second metal terminal 30b is connected to the third extending portion 34b and extends toward the mounting surface to provide a gap between the first or second side surface 14c or 14d that faces the mounting surface and the mounting surface. This arrangement increases the distance from the mounting board and reduces the stress applied by the mounting board. In addition, the thickness of a lower portion of the cover material 50 is able to be increased to provide increased insulation. More specifically, the fourth extending portion 36b extends from an end of the third extending portion 34b and is curved toward the mounting surface. The curved portion may be curved either at an obtuse angle or at a right or substantially right angle.

The length of the fourth extending portion 36b of the second metal terminal 30b in the length direction Z of the multilayer ceramic electronic component 10A is not particularly limited, but is preferably equal or substantially equal to the length of the second extending portion 34b in the length direction Z of the multilayer ceramic electronic component 10A, for example.

The distance by which the fourth extending portion 36b extends toward the mounting surface is preferably set so that the gap between the surface of the cover material 50 (described below) that faces the mounting surface and the mounting surface is in the range from about 0.15 mm to about 2 mm, for example. Since the multilayer ceramic electronic component bodies 12 covered by the cover material 50 are raised above the mounting surface, the distance from the mounting board is increased, and the effect of reducing the stress applied by the mounting board is enhanced. In addition, the thickness of a lower portion of the cover material 50 is able to be increased to provide increased insulation.

Similar to the third extending portion 34b, the fourth extending portion 36b may include a portion whose surface is processed into a recessed shape so that the base material of the second metal terminal 30b is exposed at the processed portion. Accordingly, even if the joining material in the joined section is melted, solder leakage is able to be significantly reduced or prevented because the wettability for the solder is reduced at the processed portion having a recessed shape at which the base material of the second metal terminal 30b is exposed. Thus, the melted solder does not easily flow out of the cover material 50.

As illustrated in FIG. 10, the fourth extending portion 36b includes a fifth cut portion 44b at the center or approximate center thereof so that the fourth extending portion 36b is divided into two portions. Thus, the stress applied by the mounting board after the mounting process is able to be reduced. The fourth extending portion 36b may instead be divided into three or more portions, or include no fifth cut portion 44b.

The fourth extending portion 36b may include bending cut portions 42b that differ from the above-described cut portion in both end portions thereof in the length direction Z of the multilayer ceramic electronic component 10A. The bending cut portions 42b receive the material of the second metal terminal 30b when the second metal terminal 30b is bent, thereby increasing the bendability of the second metal terminal 30b.

(d) First Mounting Portion and Second Mounting Portion

The first mounting portion 38a of the first metal terminal 30a is connected to the second extending portion 36a and mounted on the mounting board. The first mounting portion 38a extends parallel or substantially parallel to the mounting surface.

The first mounting portion 38a of the first metal terminal 30a preferably has, for example, a substantially continuous rectangular shape.

The length of the first mounting portion 38a in the length direction Z of the multilayer ceramic electronic component 10A is not particularly limited, but is preferably equal or substantially equal to the length of the second extending portion 36a in the length direction Z of the multilayer ceramic electronic component 10A, for example. As illustrated in FIG. 10, an edge of the first mounting portion 38a that is opposite to the edge connected to the second extending portion 36a may include a third cut portion 46a at the center or approximate center thereof. Thus, first mounting tabs 38a1 and 38a2 are provided on both sides of the third cut portion 46a at the edge of the first mounting portion 38a that is opposite to the edge connected to the second extending portion 36a. The third cut portion 46a may be included by partially cutting the first mounting portion 38a at the center or approximate center thereof. Preferably, the outermost ends of the first mounting portion 38a are aligned with the ends of the second extending portion 36a, for example.

The length of the first mounting portion 38a in the length direction Z of the multilayer ceramic electronic component 10A is preferably set to satisfy the following expression: area ($mm^2$) of first and second mounting portions≥weight (g) of multilayer ceramic electronic component 10A×2/cohesive force of solder, for example. In such a case, the adhesion strength between the mounting board and the multilayer ceramic electronic component 10A is sufficient relative to the gravitational mass of the multilayer ceramic electronic component 10A, so that the multilayer ceramic electronic component 10A is not easily removed from the mounting board. The cohesive force of the solder is determined by a tensile test in which the multilayer ceramic electronic component 10A is pulled away from the mounting board, and is defined as a force applied when the multilayer ceramic electronic component 10A is separated from the mounting board at the solder that mounts the multilayer ceramic electronic component 10A.

The second mounting portion 38b of the second metal terminal 30b is connected to the fourth extending portion 36b and mounted on the mounting board. The second mounting portion 38b extends parallel or substantially parallel to the mounting surface.

The second mounting portion 38b of the second metal terminal 30b preferably has, for example, a substantially continuous rectangular shape.

The length of the second mounting portion 38b in the length direction Z of the multilayer ceramic electronic component 10A is not particularly limited, but is preferably equal or substantially equal to the length of the fourth extending portion 36b in the length direction Z of the multilayer ceramic electronic component 10A, for example. As illustrated in FIG. 10, an edge of the second mounting portion 38b that is opposite to the edge connected to the fourth extending portion 36b may include a sixth cut portion 46b at the center or approximate center thereof. Thus, second mounting tabs 38b1 and 38b2 are provided on both sides of the sixth cut portion 46b at the edge of the second mounting portion 38b that is opposite to the edge connected to the fourth extending portion 36b. The sixth cut portion 46b may be included by partially cutting the second mounting portion 38b at the center or approximate center thereof. Preferably, the outermost ends of the first mounting portion 38a are aligned with the ends of the fourth extending portion 36b, for example.

The length of the second mounting portion 38b in the length direction Z of the multilayer ceramic electronic component 10A is preferably set to satisfy the following expression: area (mm²) of first and second mounting portions≥weight (g) of multilayer ceramic electronic component 10A×2/cohesive force of solder, for example. In such a case, the adhesion strength between the mounting board and the multilayer ceramic electronic component 10A is sufficient relative to the gravitational mass of the multilayer ceramic electronic component 10A, so that the multilayer ceramic electronic component 10A is not easily removed from the mounting board. The cohesive force of the solder is determined by a tensile test in which the multilayer ceramic electronic component 10A is pulled away from the mounting board, and is defined as a force applied when the multilayer ceramic electronic component 10A is separated from the mounting board at the solder that mounts the multilayer ceramic electronic component 10A.

Each metal terminal 30 includes a terminal body and a plating film provided on the surface of the terminal body.

The terminal body preferably includes Ni, Fe, Cu, Ag, Cr or an alloy containing at least one or more of these metals as main components, for example. More specifically, for example, the base material of the terminal body is preferably Fe-18Cr alloy, Fe-42Ni alloy, or Cu-8Sn alloy, for example. The thickness of the terminal body of each metal terminal 30 is preferably in the range from about 0.05 mm to about 0.5 mm, for example.

The plating film includes a lower plating film and an upper plating film. The lower plating film is provided on the surface of the terminal body, and the upper plating film is provided on the surface of the lower plating film. Each of the lower plating film and the upper plating film may include a plurality of plating films.

The lower plating film may include Ni, Fe, Cu, Ag, Cr or an alloy containing at least one or more of these metals as the main components, for example. Preferably, the lower plating film includes Ni, Fe, Cr or an alloy containing at least one or more of these metals as the main components, for example.

The thickness of the lower plating film is preferably in the range from about 0.2 μm to about 5.0 μm, for example.

The upper plating film may include Sn, Ag, Au, or an alloy containing at least one or more of these metals as the main components, for example. Preferably, the upper plating film includes Sn or an alloy containing Sn as the main component, for example. When the upper plating film includes Sn or an alloy containing Sn as the main component, solderability of the metal terminals 30 and the outer electrodes 26 is able to be increased.

The thickness of the upper plating film is preferably in the range from about 1.0 μm to about 5.0 μm, for example.

When the terminal body and the lower plating film each include Ni, Fe, or Cr having high melting points or an alloy containing at least one or more of these metals as the main components, the heat resistance of the outer electrodes 26 is able to be increased.

The plating film may be omitted at least on the peripheral surfaces of the mounting portions 38a and 38b and the extending portions 34a, 34b, 36a, and 36b of the metal terminals 30. In such a case, solder that mounts the multilayer ceramic electronic component 10A does not easily spread upward along the metal terminals 30. Therefore, the solder does not easily spread into the spaces between each multilayer ceramic electronic component body 12 and the metal terminals 30 (raised portions), and the raised portions are able to be significantly reduced or prevented from being filled with the solder. Accordingly, the raised portions have a sufficiently large space, so that transmission of vibration to the board is able to be significantly reduced or prevented and a stable squeal reducing effect is provided. The plating film may be omitted on all of the peripheral surfaces of the metal terminals 30.

The plating film may be removed from the peripheral surfaces of the mounting portions 38a and 38b and the extending portions 34a, 34b, 36a, and 36b of the metal terminals 30 or from all of the peripheral surfaces of the metal terminals 30 by a mechanical method (cutting or grinding), by laser trimming, or by applying a plating remover (for example, sodium hydroxide), for example. Alternatively, portions of the metal terminals 30 on which no plating film is to be provided may be covered with a resist before forming the plating film, and then the resist may be removed after the plating film is formed on the metal terminals 30.

(3) Joining Material

The joining material is used to connect the first outer electrodes 26a to the first metal terminal 30a and to connect the second outer electrodes 26b to the second metal terminal 30b.

The joining material is preferably solder, in particular, a Pb-free solder having a high melting point, for example. In such a case, the multilayer ceramic electronic component bodies 12 and the metal terminals 30 may be strongly joined together, and the joined section is resistant to heat at the flow or reflow temperature in the mounting process.

The Pb-free solder having a high melting point is preferably a lead-free solder, such as Sn—Sb-based, Sn—Ag—Cu-based, Sn—Cu-based, or Sn—Bi-based solder, in particular, any of Sn-10Sb to Sn-15Sb solders, for example. In such a case, the joined section is resistant to heat in the mounting process.

(4) Cover Material

The cover material 50 covers the multilayer ceramic electronic component bodies 12, the first outer electrodes 26a, the second outer electrodes 26b, a portion of the first metal terminal 30a (the first terminal joining portion 32a and at least a portion of the first extending portion 34a), and a portion of the second metal terminal 30b (the second terminal joining portion 32b and at least a portion of the third extending portion 34b). Thus, the length of the portion molded by the cover material 50 is able to be increased. As a result, a sufficient insulating surface distance (creeping distance) is able to be provided between the conductors. The cover material 50 fills the gaps between the multilayer ceramic electronic component bodies 12.

The shape of the cover material 50 is not particularly limited, and may preferably be a trapezoidal or substantially trapezoidal shape. The cover material 50 may instead have a rectangular or substantially rectangular parallelepiped shape. The shape of corner portions of the cover material 50 is not particularly limited, and the corner portions may be rounded.

The first principal surface 50a and the second principal surface 50b of the cover material 50 preferably have a planar shape, for example. In such a case, the first principal surface 50a and the second principal surface 50b are flat or substantially flat, and suction failure of a mounter of a mounting device that mounts the multilayer ceramic electronic component 10A onto the mounting board is able to be significantly reduced or prevented. Accordingly, the multilayer ceramic electronic component 10A is able to be reliably mounted onto the mounting board. As a result, the occurrence of mounting failure is able to be significantly reduced or prevented.

The cover material 50 is formed by, for example, applying silicone-based or epoxy-based resin in liquid or powder form. The cover material 50 may instead be formed by molding an engineering plastic material by injection molding or transfer molding. In particular, the material of the cover material 50 is preferably a thermosetting epoxy resin, for example. In such a case, adhesion is provided between the cover material 50 and the multilayer ceramic electronic component bodies 12 or between the cover material 50 and the metal terminals 30, and the voltage resistance and moisture resistance are able to be increased.

The dimension of the multilayer ceramic electronic component 10A including the multilayer ceramic electronic component bodies 12, the cover material 50, the first metal terminal 30a, and the second metal terminal 30b in the length direction Z is defined as dimension L. In other words, the length of the multilayer ceramic electronic component 10A in the length direction Z connecting the principal surfaces of each multilayer ceramic electronic component body 12 is defined as dimension L. The dimension L is preferably in the range from about 5.0 mm to about 20.0 mm, for example.

The dimension of the multilayer ceramic electronic component 10A including the multilayer ceramic electronic component bodies 12, the cover material 50, the first metal terminal 30a, and the second metal terminal 30b in the width direction Y is defined as dimension W. In other words, the length of the multilayer ceramic electronic component 10A in the width direction Y connecting the end surfaces of each multilayer ceramic electronic component body 12 is defined as dimension W. The dimension W is preferably in the range from about 5.0 mm to about 20.0 mm, for example.

The dimension of the multilayer ceramic electronic component 10A including the multilayer ceramic electronic component bodies 12, the cover material 50, the first metal terminal 30a, and the second metal terminal 30b in the height direction X is defined as dimension T. In other words, the length of the multilayer ceramic electronic component 10A in the height direction X connecting the side surfaces of each multilayer ceramic electronic component body 12 is defined as dimension T. The dimension T is preferably in the range from about 2.0 mm to about 10.0 mm, for example.

The multilayer ceramic electronic component bodies 12 of the multilayer ceramic electronic component 10A are provided with gaps therebetween. The gaps are preferably in the range from about 0.45 mm to about 1.0 mm, for example. In such a case, resin that fills the gaps provides heat insulation, and the amount of heat generated is able to be reduced.

In the multilayer ceramic electronic component 10A illustrated in FIG. 1, the dimension t of each multilayer ceramic electronic component body 12 in the lamination direction x connecting the first and second principal surfaces 14a and 14b is less than the dimension w of each multilayer ceramic electronic component body 12 in the width direction y connecting the first and second side surfaces 14c and 14d, the first or second side surface 14c or 14d of each multilayer ceramic electronic component body 12 faces the mounting surface, the first metal terminal 30a extends between the first outer electrodes 26a of the multilayer ceramic electronic component bodies 12, the second metal terminal 30b extends between the second outer electrodes 26b of the multilayer ceramic electronic component bodies 12, and the cover material 50 covers the multilayer bodies 14, the first outer electrodes 26a, the second outer electrodes 26b, and at least portions of the first metal terminal 30a and the second metal terminal 30b. Accordingly, a sufficient creeping distance is able to be provided, so that creeping discharge is reduced. In addition, the multilayer ceramic electronic component 10A is small and surface-mountable.

Second Preferred Embodiment

Figure 11:
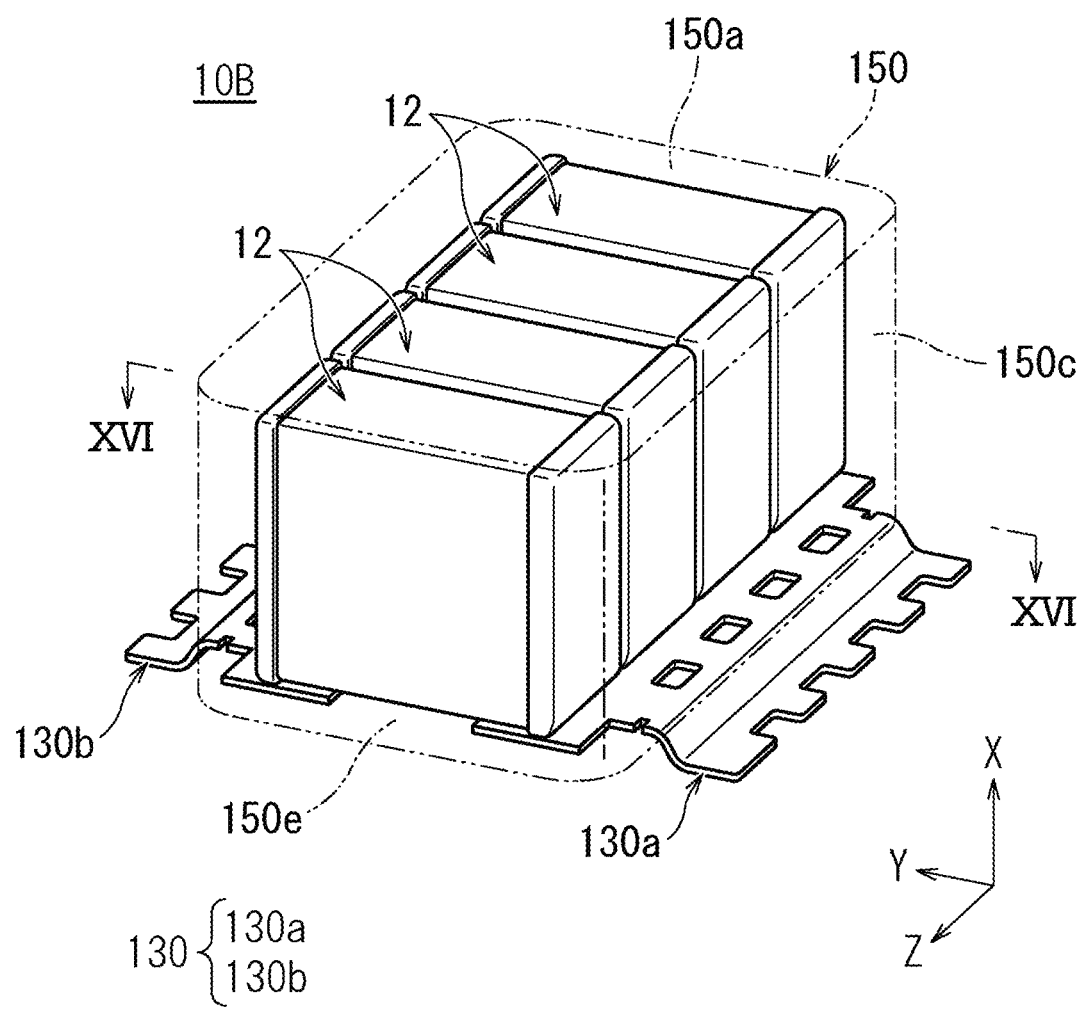
FIG. 11 is an external perspective view of an example of a multilayer ceramic electronic component according to a second preferred embodiment of the present invention.
Figure 12:
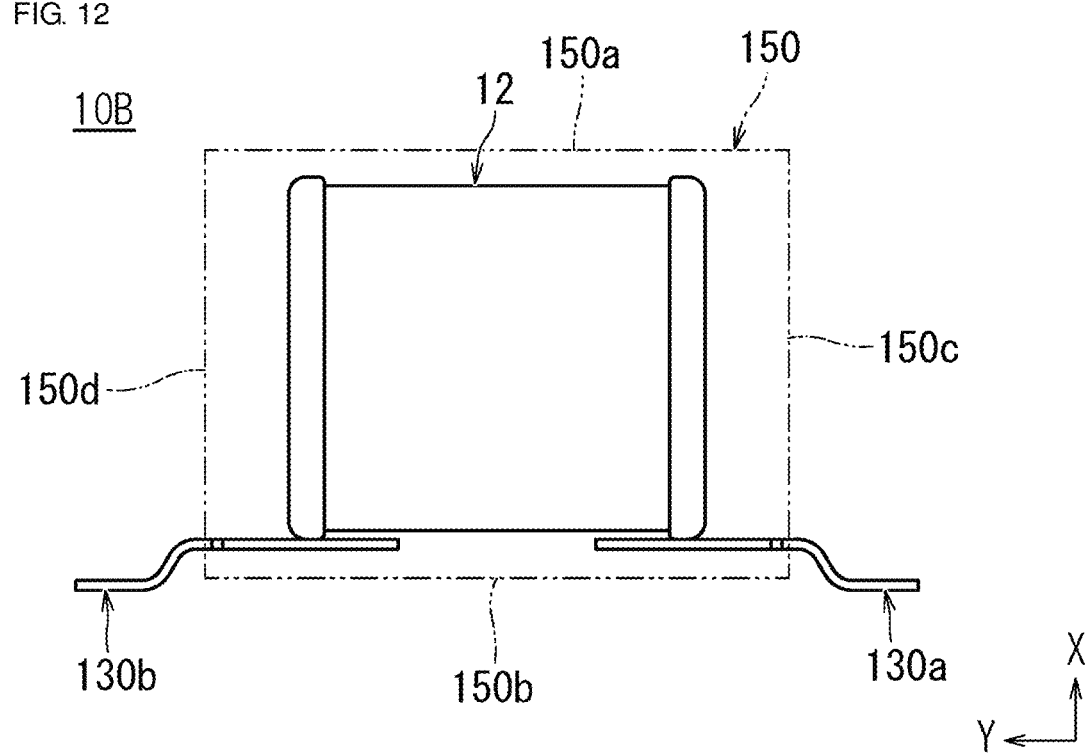
FIG. 12 is a front view of the multilayer ceramic electronic component according to the second preferred embodiment of the present invention illustrated in FIG. 11.
Figure 13:
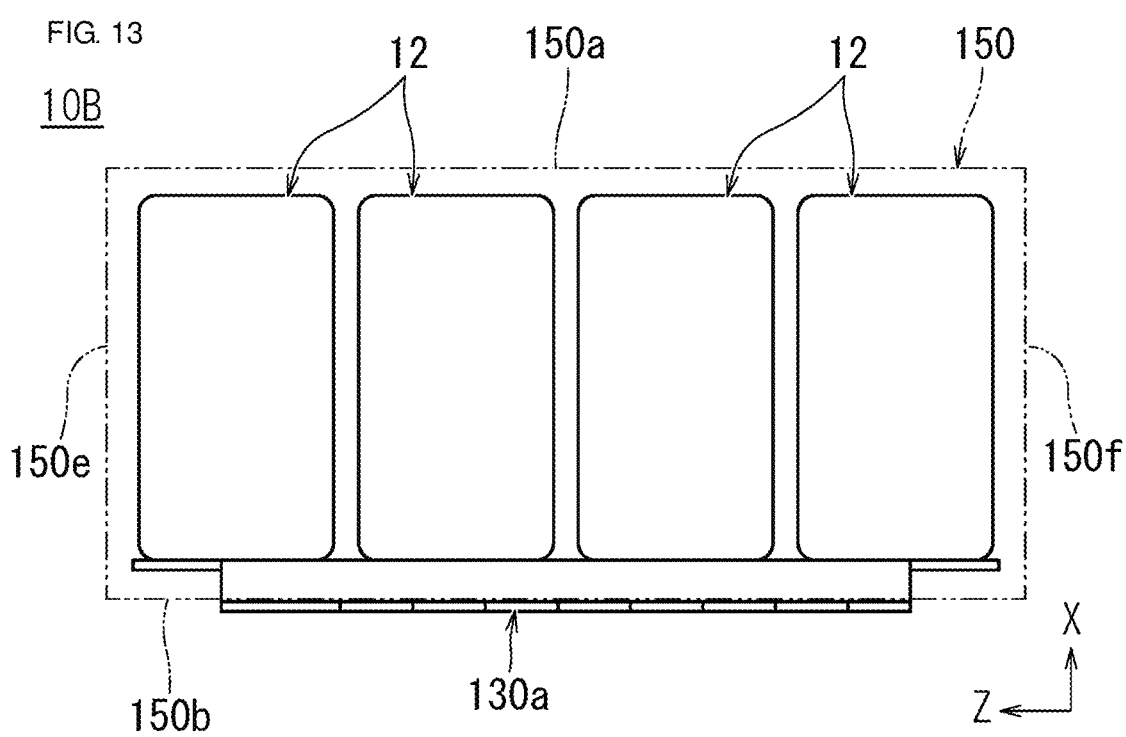
FIG. 13 is a side view of the multilayer ceramic electronic component according to the second preferred embodiment of the present invention illustrated in FIG. 11.
Figure 14:
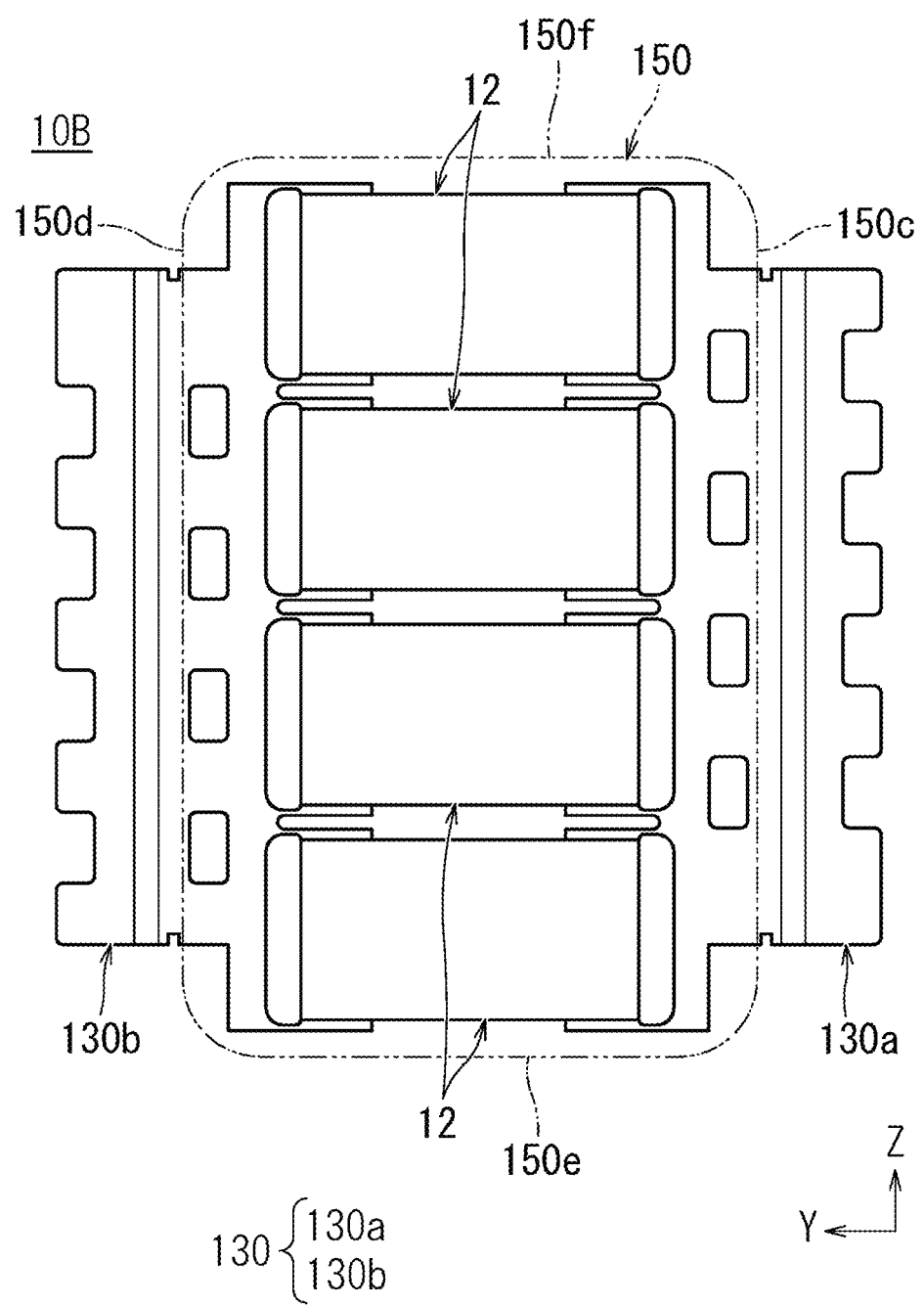
FIG. 14 is a top view of the multilayer ceramic electronic component according to the second preferred embodiment of the present invention illustrated in FIG. 11.
Figure 15:
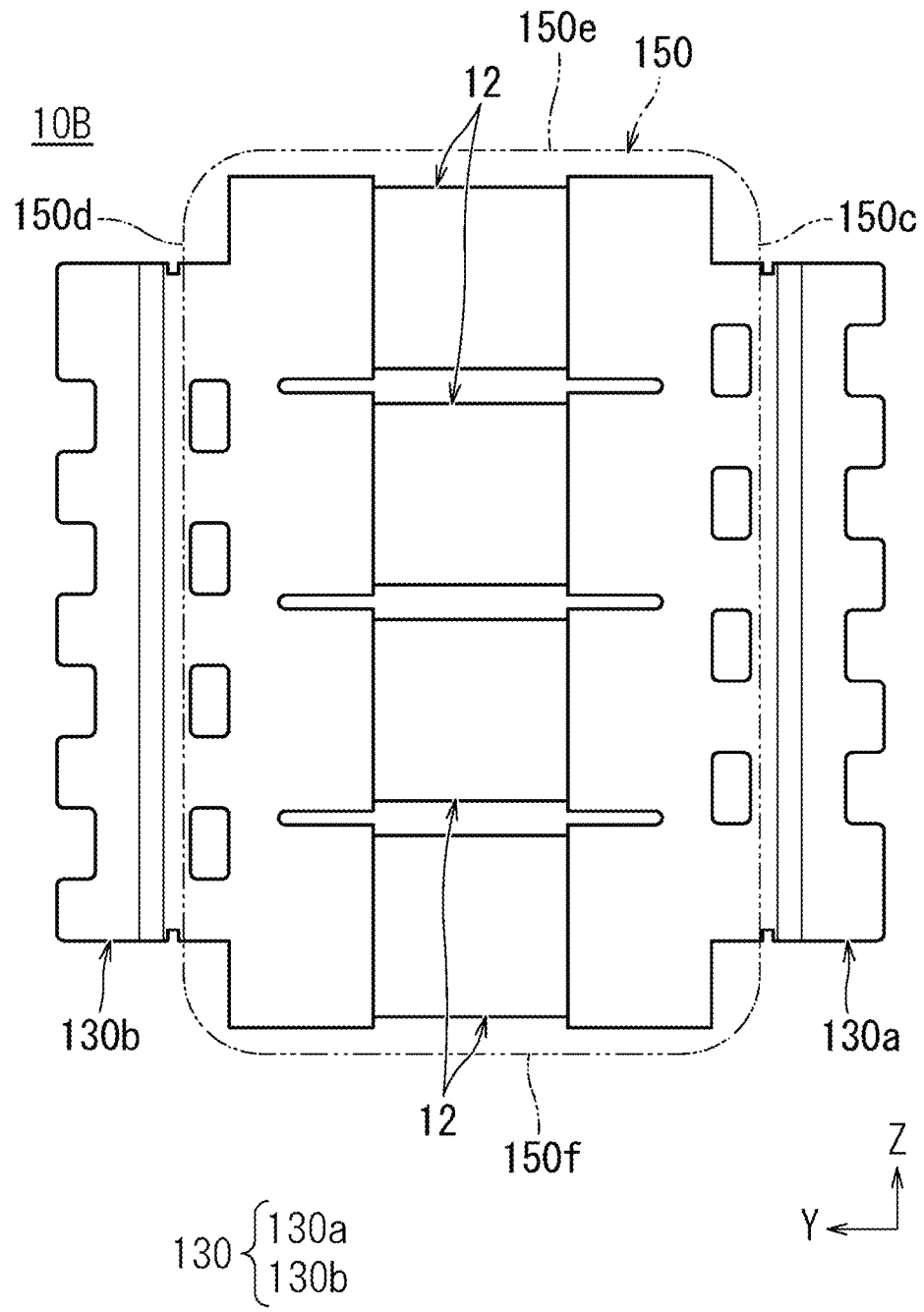
FIG. 15 is a bottom view of the multilayer ceramic electronic component according to the second preferred embodiment of the present invention illustrated in FIG. 11.
Figure 16:
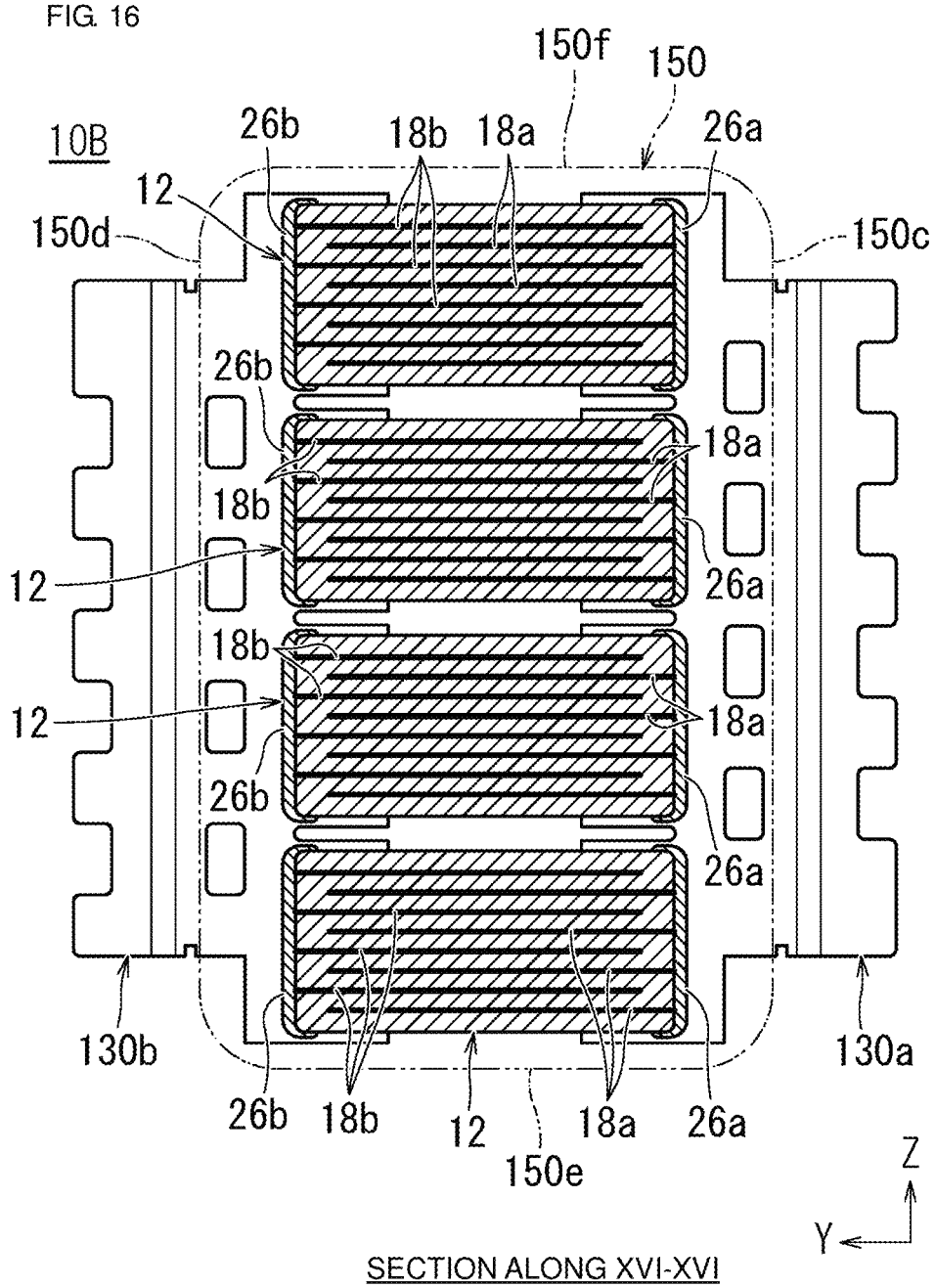
FIG. 16 is a sectional view of the multilayer ceramic electronic component illustrated in FIG. 11 taken along line XVI-XVI.
Figure 17:
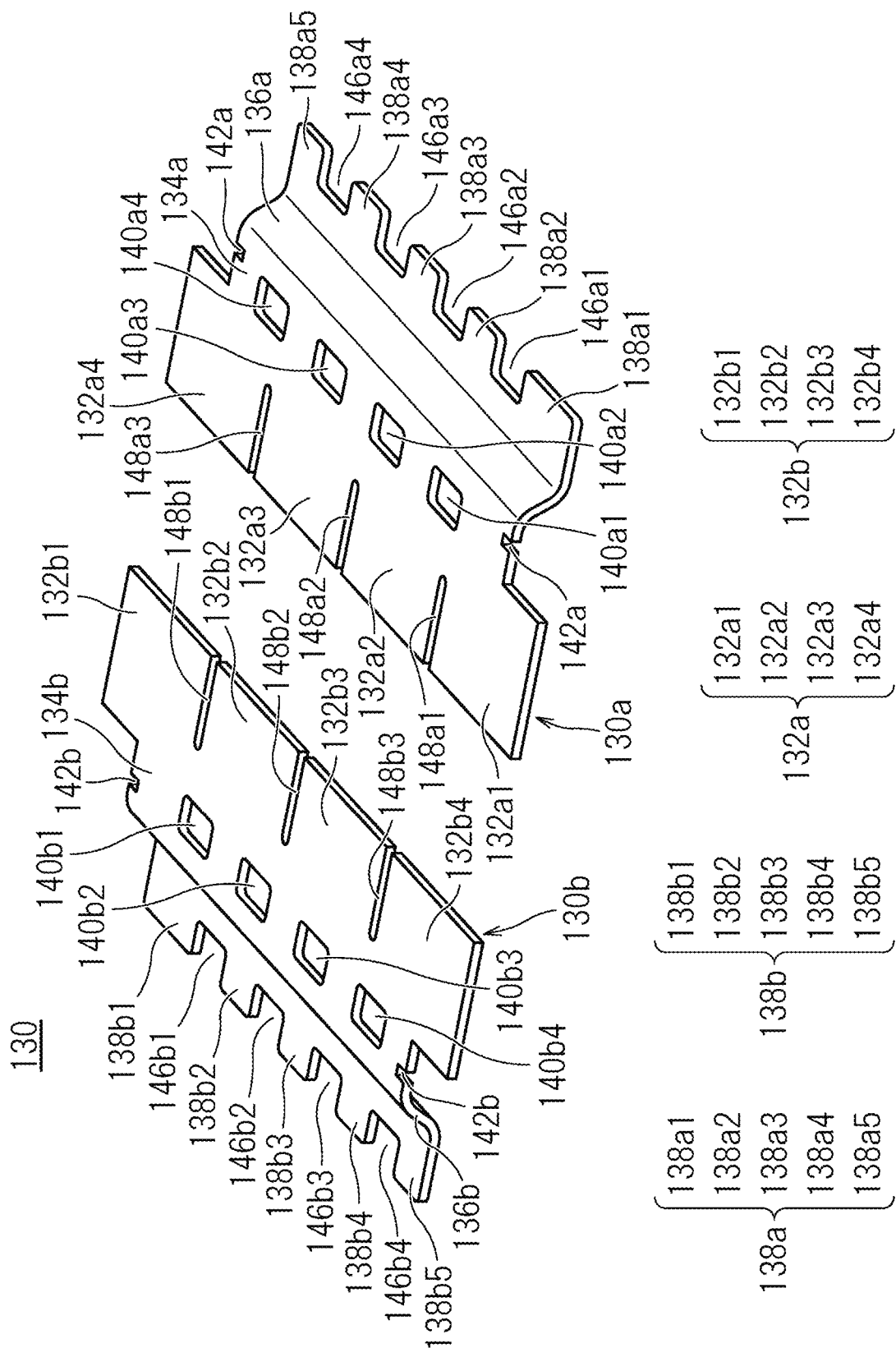
FIG. 17 is an external perspective view of metal terminals included in the multilayer ceramic electronic component according to the second preferred embodiment of the present invention.

A multilayer ceramic electronic component according to a second preferred embodiment of the present invention is described below with reference to the drawings. FIG. 11 is an external perspective view of an example of a multilayer ceramic electronic component according to a second preferred embodiment of the present invention. FIG. 12 is a front view of the multilayer ceramic electronic component according to the second preferred embodiment of the present invention illustrated in FIG. 11. FIG. 13 is a side view of the multilayer ceramic electronic component according to the second preferred embodiment of the present invention illustrated in FIG. 11. FIG. 14 is a top view of the multilayer ceramic electronic component according to the second preferred embodiment of the present invention illustrated in FIG. 11. FIG. 15 is a bottom view of the multilayer ceramic electronic component according to the second preferred embodiment of the present invention illustrated in FIG. 11. FIG. 16 is a sectional view of the multilayer ceramic electronic component illustrated in FIG. 11 taken along line XVI-XVI. FIG. 17 is an external perspective view of metal terminals included in the multilayer ceramic electronic component according to the second preferred embodiment of the present invention.

A multilayer ceramic electronic component 10B according to the present preferred embodiment includes a structure similar to that of the multilayer ceramic electronic component 10A described with reference to FIG. 1 except that the structures of a pair of metal terminals 130 and a cover material 150 differ from those of the pair of metal terminals 30 and the cover material 50. Accordingly, components that are the same as those in the multilayer ceramic electronic component 10A illustrated in FIG. 1 are denoted by the same reference signs, and description thereof is thus omitted.

The multilayer ceramic electronic component 10B includes a plurality of multilayer ceramic electronic component bodies 12. The multilayer ceramic electronic component 10B also includes metal terminals 130 connected to outer electrodes 26 of the multilayer ceramic electronic component bodies 12 and a cover material 150 that covers multilayer bodies 14 and the outer electrodes 26 of the multilayer ceramic electronic component bodies 12 and portions of the metal terminals 130.

The cover material 150 includes a first principal surface 150a and a second principal surface 150b that are respectively adjacent to or in a vicinity of the first side surface 14c and the second side surface 14d of each multilayer ceramic electronic component body 12; a first side surface 150c and a second side surface 150d that are respectively adjacent to or in a vicinity of the first end surface 14e and the second end surface 14f of each multilayer ceramic electronic component body 12; and a first end surface 150e and a second end surface 150f that are respectively adjacent to or in a vicinity of the first principal surface 14a and the second principal surface 14b of each multilayer ceramic electronic component body 12.

The metal terminals 130 of the multilayer ceramic electronic component 10B illustrated in FIG. 17 include a first metal terminal 130a and a second metal terminal 130b.

The first metal terminal 130a is connected to the first outer electrode 26a of each multilayer ceramic electronic component body 12 by a joining material. More specifically, the first metal terminal 130a is connected to the first outer electrode 26a on the first or second side surface 14c or 14d of each multilayer ceramic electronic component body 12.

The second metal terminal 130b is connected to the second outer electrode 26b of each multilayer ceramic electronic component body 12 by a joining material. More specifically, the second metal terminal 130b is connected to the second outer electrode 26b on the first or second side surface 14c or 14d of each multilayer ceramic electronic component body 12.

The first metal terminal 130a includes a first terminal joining portion 132a that is connected to the first outer electrodes 26a; a first extending portion 134a that is connected to the first terminal joining portion 132a and extends in a direction parallel or substantially parallel to the first side surfaces 14c (side surfaces facing the mounting surface) and that is spaced away from the first side surfaces 14c (side surfaces facing the mounting surface) and the mounting surface; a second extending portion 136a that is connected to the first extending portion 134a and extends toward the mounting surface positioned opposite the multilayer ceramic electronic component bodies 12; and a first mounting portion 138a that is connected to the second extending portion 136a and mounted on the mounting board. The structure of the extending portions is not limited to the above-described structure, and a curved extending portion may be additionally provided.

The second metal terminal 130b includes a second terminal joining portion 132b that is connected to the second outer electrodes 26b; a third extending portion 134b that is connected to the second terminal joining portion 132b and extends in a direction parallel or substantially parallel to the first side surfaces 14c (side surfaces facing the mounting surface) and that is spaced away from the first side surfaces 14c (side surfaces facing the mounting surface) and the mounting surface; a fourth extending portion 136b that is connected to the third extending portion 134b and extends toward the mounting surface positioned opposite the multilayer ceramic electronic component bodies 12; and a second mounting portion 138b that is connected to the fourth extending portion 136b and mounted on the mounting board. The structure of the extending portions is not limited to the above-described structure, and a curved extending portion may be additionally provided.

As illustrated in FIG. 17, the first terminal joining portion 132a of the first metal terminal 130a included in the multilayer ceramic electronic component 10B illustrated in FIG. 11 differs from the first terminal joining portion 32a of the first metal terminal 30a in that a plurality of first gaps 148a1 to 148a3 are provided at positions between the multilayer ceramic electronic component bodies 12. The first gaps 148a1 to 148a3 divide the first terminal joining portion 132a into a plurality of first joining tabs 132a1 to 132a4. Thus, the first joining tabs 132a1 to 132a4 are provided for the first outer electrodes 26a of respective ones of the multilayer ceramic electronic component bodies 12.

As illustrated in FIG. 17, the second terminal joining portion 132b of the second metal terminal 130b differs from the second terminal joining portion 32b of the second metal terminal 30b in that a plurality of second gaps 148b1 to 148b3 are provided at positions between the multilayer ceramic electronic component bodies 12. The second gaps 148b1 to 148b3 divide the second terminal joining portion 132b into a plurality of second joining tabs 132b1 to 132b4. Thus, the second joining tabs 132b1 to 132b4 are provided for the second outer electrodes 26b of respective ones of the multilayer ceramic electronic component bodies 12.

In the case in which the first joining tabs 132a1 to 132a4 are individually provided for the first outer electrodes 26a of the respective multilayer ceramic electronic component bodies 12 as illustrated in FIG. 17, the length of each of the first joining tabs 132a1 to 132a4 of the first terminal joining portion 132a of the first metal terminal 130a in the length direction Z of the multilayer ceramic electronic component 10B preferably corresponds to the length of the first outer electrode 26a on the first side surface 14c (side surface facing the mounting surface) of each multilayer ceramic electronic component body 12 in the lamination direction x, for example.

One end of the first terminal joining portion 132a of the first metal terminal 130a near the first end surface 150e of the multilayer ceramic electronic component 10B preferably protrudes by a distance in the range from about 0.1 mm to about 0.2 mm, for example, from the edge of the first outer electrode 26a on the first or second side surface 14c or 14d (side surface facing the mounting surface) of one of the multilayer ceramic electronic component bodies 12 that is adjacent to or in a vicinity of the first end surface 150e of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

Similarly, the other end of the first terminal joining portion 132a of the first metal terminal 130a near the second end surface 150f of the multilayer ceramic electronic component 10B preferably protrudes by a distance in the range from about 0.1 mm to about 0.2 mm, for example, from the edge of the first outer electrode 26a on the first or second side surface 14c or 14d (side surface facing the mounting surface) of one of the multilayer ceramic electronic component bodies 12 that is adjacent to or in a vicinity of the second end surface 150f of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

In the case in which the second joining tabs 132b1 to 132b4 are individually provided for the second outer electrodes 26b of the respective multilayer ceramic electronic component bodies 12 as illustrated in FIG. 17, the length of each of the second joining tabs 132b1 to 132b4 of the second terminal joining portion 132b of the second metal terminal 130b in the length direction Z of the multilayer ceramic electronic component 10B preferably corresponds to the length of the second outer electrode 26b on the first side surface 14c (side surface facing the mounting surface) of each multilayer ceramic electronic component body 12 in the lamination direction x, for example.

One end of the second terminal joining portion 132b of the second metal terminal 130b near the first end surface 150e of the multilayer ceramic electronic component 10B preferably protrudes by a distance in the range from about 0.1 mm to about 0.2 mm, for example, from the edge of the second outer electrode 26b on the first or second side surface 14c or 14d (side surface facing the mounting surface) of one of the multilayer ceramic electronic component bodies 12 that is adjacent to or in a vicinity of the first end surface 150e of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

Similarly, the other end of the second terminal joining portion 132b of the second metal terminal 130b near the second end surface 150f of the multilayer ceramic electronic component 10B preferably protrudes by a distance in the range from about 0.1 mm to about 0.2 mm, for example, from the edge of the second outer electrode 26b on the first or second side surface 14c or 14d (side surface facing the mounting surface) of one of the multilayer ceramic electronic component bodies 12 that is adjacent to or in a vicinity of the second end surface 150f of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

The first extending portion 134a of the first metal terminal 130a includes a plurality of first cut portions 140a1 to 140a4.

Similarly, the third extending portion 134b of the second metal terminal 130b includes a plurality of fourth cut portions 140b1 to 140b4.

The second extending portion 136a may include bending cut portions 142a that differ from the above-described cut portions in both end portions thereof in the length direction Z of the multilayer ceramic electronic component 10B. The bending cut portions 142a receive the material of the first metal terminal 130a when the first metal terminal 130a is bent, thereby increasing the bendability of the first metal terminal 130a.

The fourth extending portion 136b may include bending cut portions 142b that differ from the above-described cut portions in both end portions thereof in the length direction Z of the multilayer ceramic electronic component 10B. The bending cut portions 142b receive the material of the second metal terminal 130b when the second metal terminal 130b is bent, thereby increasing the bendability of the second metal terminal 130b.

An edge of the first mounting portion 138a that is opposite to the edge connected to the second extending portion 136a includes third cut portions 146a1 to 146a4. Thus, first mounting tabs 138a1 to 138a5 are provided on both sides of the third cut portions 146a1 to 146a4 at the edge of the first mounting portion 138a that is opposite to the edge connected to the second extending portion 136a.

Similarly, an edge of the second mounting portion 138b that is opposite to the edge connected to the fourth extending portion 136b includes sixth cut portions 146b1 to 146b4. Thus, second mounting tabs 138b1 to 138b5 are provided on both sides of the sixth cut portions 146b1 to 146b4 at the edge of the second mounting portion 138b that is opposite to the edge connected to the fourth extending portion 136b.

Unlike the cover material 50 of the multilayer ceramic electronic component 10A, the cover material 150 of the multilayer ceramic electronic component 10B illustrated in FIG. 11 preferably has a rectangular or substantially rectangular parallelepiped shape. The cover material 150 may instead have a substantially trapezoidal shape.

The multilayer ceramic electronic component 10B illustrated in FIG. 11 provides the same or similar advantageous effects as those of the multilayer ceramic electronic component 10A illustrated in FIG. 1.

Figure 18:
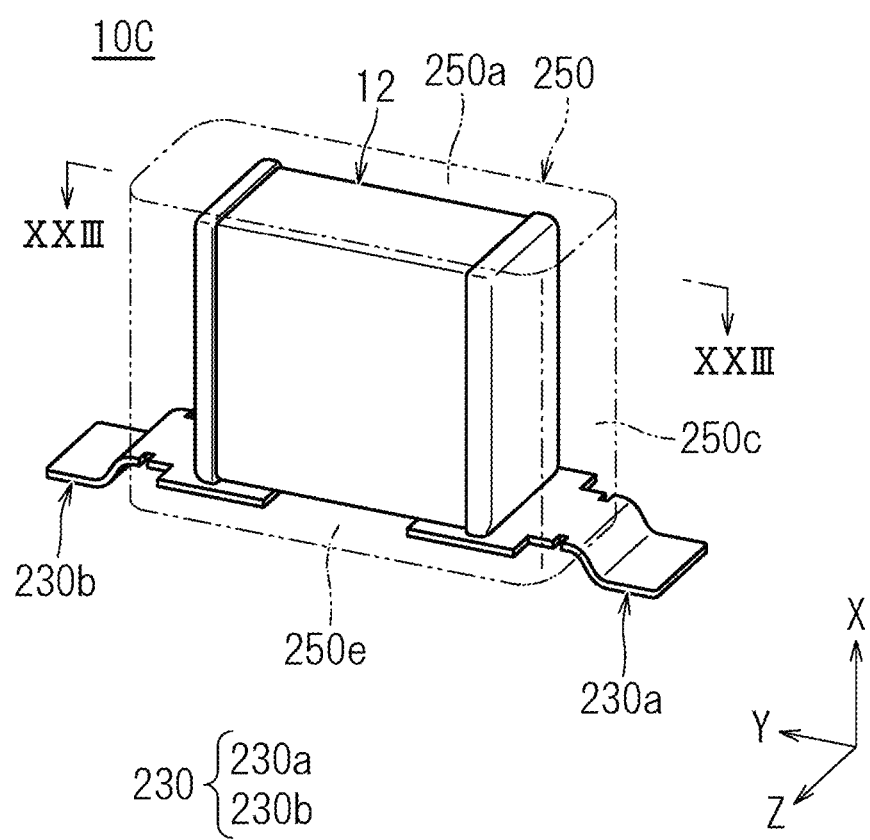
FIG. 18 is an external perspective view of an example of a multilayer ceramic electronic component according to a modification of the multilayer ceramic electronic component illustrated in FIG. 1.
Figure 19:
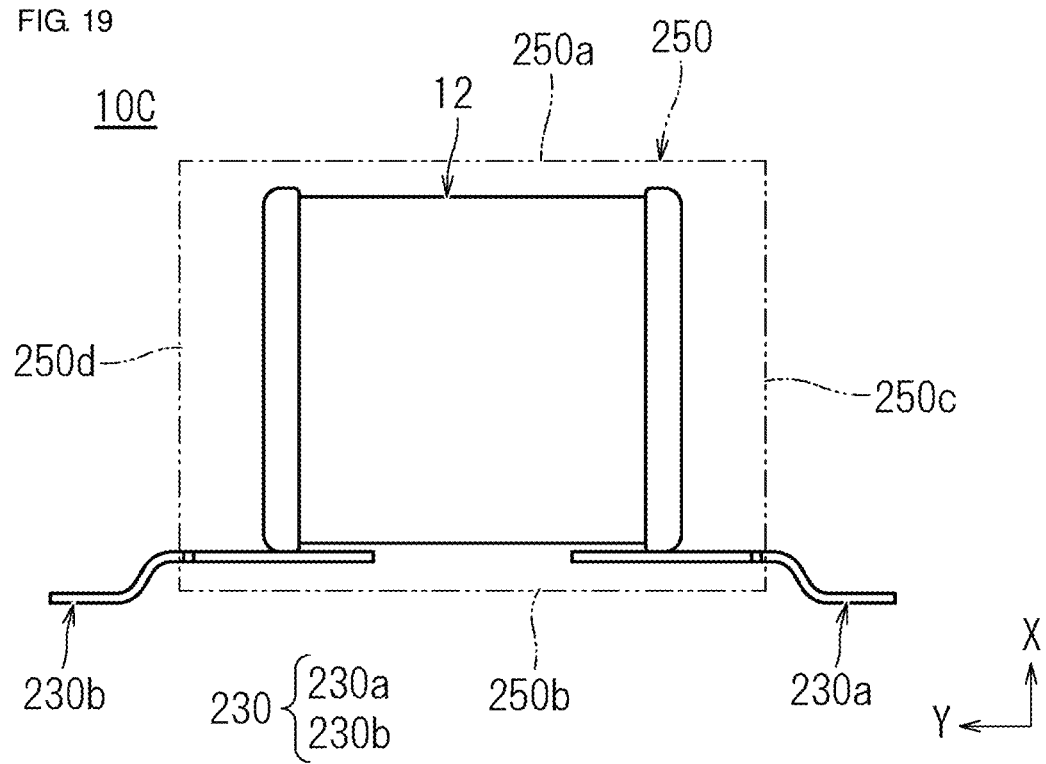
FIG. 19 is a front view of the multilayer ceramic electronic component according to the modification illustrated in FIG. 18.
Figure 20:
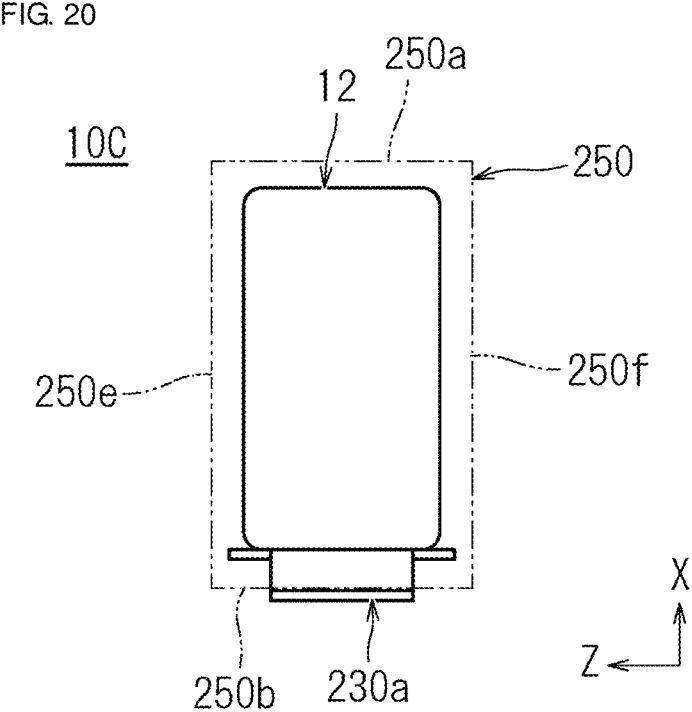
FIG. 20 is a side view of the multilayer ceramic electronic component according to the modification illustrated in FIG. 18.
Figure 21:
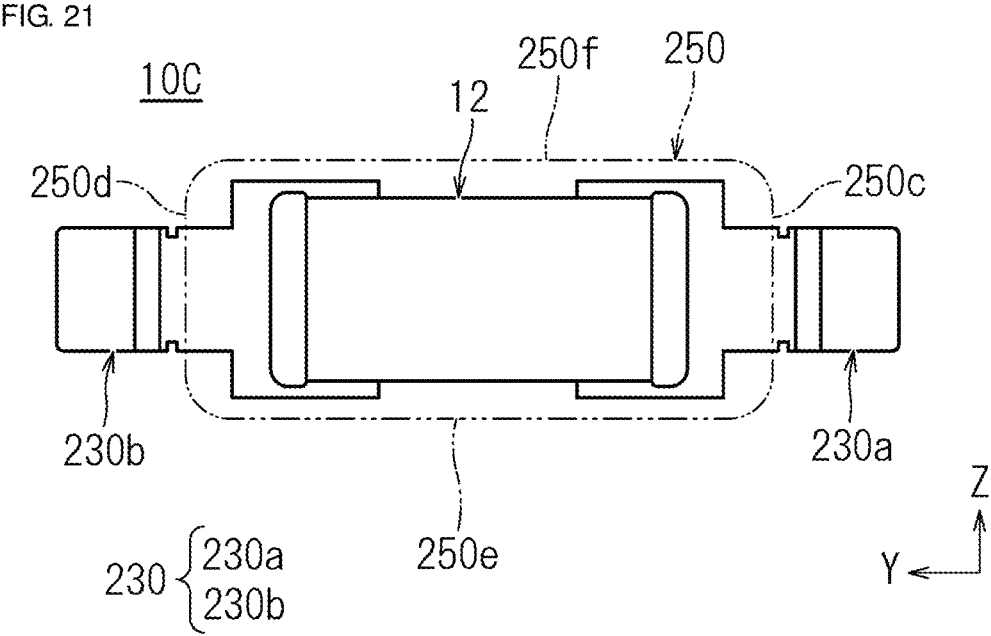
FIG. 21 is a top view of the multilayer ceramic electronic component according to the modification illustrated in FIG. 18.
Figure 22:
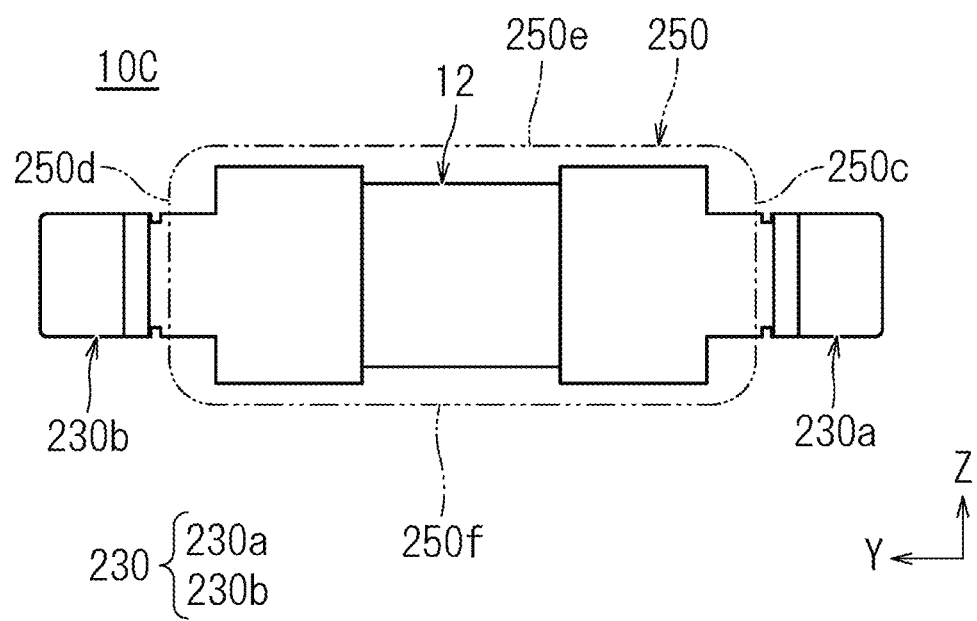
FIG. 22 is a bottom view of the multilayer ceramic electronic component according to the modification illustrated in FIG. 18.
Figure 23:
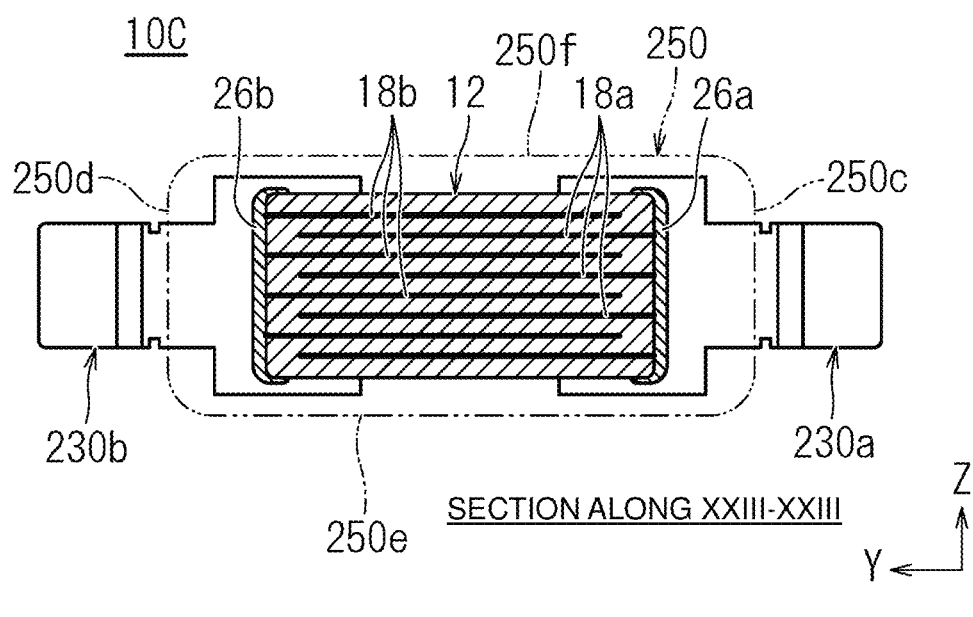
FIG. 23 is a sectional view of the multilayer ceramic electronic component illustrated in FIG. 18 taken along line XXIII-XXIII.
Figure 24:
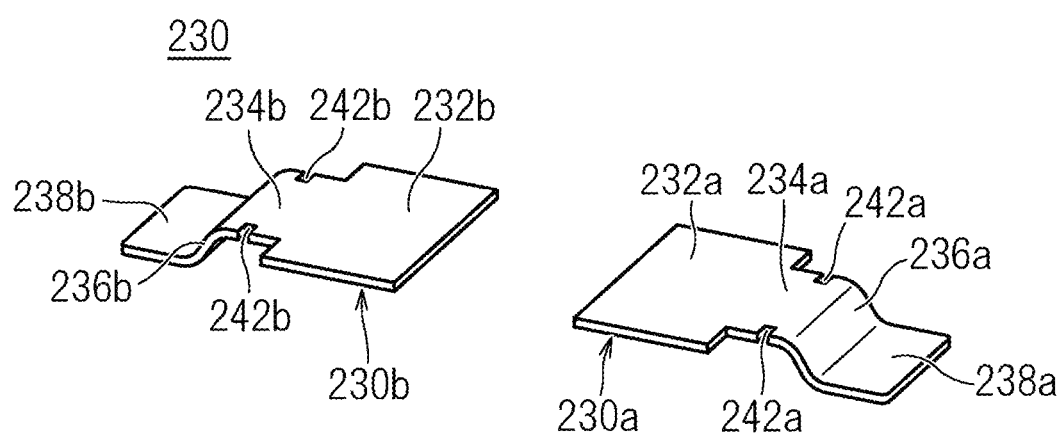
FIG. 24 is an external perspective view of metal terminals included in the multilayer ceramic electronic component according to the modification.

A multilayer ceramic electronic component according to a modification of the multilayer ceramic electronic component illustrated in FIG. 1 will now be described. FIG. 18 is an external perspective view of an example of a multilayer ceramic electronic component according to a modification of the multilayer ceramic electronic component illustrated in FIG. 1. FIG. 19 is a front view of the multilayer ceramic electronic component according to the modification illustrated in FIG. 18. FIG. 20 is a side view of the multilayer ceramic electronic component according to the modification illustrated in FIG. 18. FIG. 21 is a top view of the multilayer ceramic electronic component according to the modification illustrated in FIG. 18. FIG. 22 is a bottom view of the multilayer ceramic electronic component according to the modification illustrated in FIG. 18. FIG. 23 is a sectional view of the multilayer ceramic electronic component illustrated in FIG. 18 taken along line XXIII-XXIII. FIG. 24 is an external perspective view of metal terminals included in the multilayer ceramic electronic component according to the modification.

A multilayer ceramic electronic component 10C includes a single multilayer ceramic electronic component body 12. The multilayer ceramic electronic component 10C also includes metal terminals 230 connected to outer electrodes 26 of the multilayer ceramic electronic component body 12 and a cover material 250 that covers a multilayer body 14 and the outer electrodes 26 of the multilayer ceramic electronic component body 12 and portions of the metal terminals 230.

The cover material 250 includes a first principal surface 250a and a second principal surface 250b that are respectively adjacent to or in a vicinity of the first side surface 14c and the second side surface 14d of the multilayer ceramic electronic component body 12; a first side surface 250c and a second side surface 250d that are respectively adjacent to or in a vicinity of the first end surface 14e and the second end surface 14f of the multilayer ceramic electronic component body 12; and a first end surface 250e and a second end surface 250f that are respectively adjacent to or in a vicinity of the first principal surface 14a and the second principal surface 14b of the multilayer ceramic electronic component body 12.

The metal terminals 230 of the multilayer ceramic electronic component 10C illustrated in FIG. 18 include a first metal terminal 230a and a second metal terminal 230b. The first metal terminal 230a is connected to the first outer electrode 26a of the multilayer ceramic electronic component body 12 by a joining material. More specifically, the first metal terminal 230a is connected to the first outer electrode 26a on the first or second side surface 14c or 14d of the multilayer ceramic electronic component body 12.

The second metal terminal 230b is connected to the second outer electrode 26b of the multilayer ceramic electronic component body 12 by a joining material. More specifically, the second metal terminal 230b is connected to the second outer electrode 26b on the first or second side surface 14c or 14d of the multilayer ceramic electronic component body 12.

The first metal terminal 230a includes a first terminal joining portion 232a that is connected to the first outer electrode 26a; a first extending portion 234a that is connected to the first terminal joining portion 232a and extends in a direction substantially parallel to the first side surface 14c (side surface facing the mounting surface) and that is spaced away from the first side surface 14c (side surface facing the mounting surface) and the mounting surface; a second extending portion 236a that is connected to the first extending portion 234a and extends toward the mounting surface positioned opposite the multilayer ceramic electronic component body 12; and a first mounting portion 238a that is connected to the second extending portion 236a and mounted on the mounting board. The structure of the extending portions is not limited to the above-described structure, and a curved extending portion may be additionally provided.

The second metal terminal 230b includes a second terminal joining portion 232b that is connected to the second outer electrode 26b; a third extending portion 234b that is connected to the second terminal joining portion 232b and extends in a direction parallel or substantially parallel to the first side surface 14c (side surface facing the mounting surface) and that is spaced away from the first side surface 14c (side surface facing the mounting surface) and the mounting surface; a fourth extending portion 236b that is connected to the third extending portion 234b and extends toward the mounting surface positioned opposite the multilayer ceramic electronic component body 12; and a second mounting portion 238b that is connected to the fourth extending portion 236b and mounted on the mounting board. The structure of the extending portions is not limited to the above-described structure, and a curved extending portion may be additionally provided.

The second extending portion 236a may include bending cut portions 242a that differ from the above-described cut portions in both end portions thereof in the length direction Z of the multilayer ceramic electronic component 10C. The bending cut portions 242a receive the material of the first metal terminal 230a when the first metal terminal 230a is bent, thus increasing the bendability of the first metal terminal 230a.

The fourth extending portion 236b may include bending cut portions 242b that differ from the above-described cut portions in both end portions thereof in the length direction Z of the multilayer ceramic electronic component 10C. The bending cut portions 242b receive the material of the second metal terminal 230b when the second metal terminal 230b is bent, thereby increasing the bendability of the second metal terminal 230b.

The multilayer ceramic electronic component 10C illustrated in FIG. 18 provides the same or similar advantageous effects as those of the multilayer ceramic electronic component 10A illustrated in FIG. 1.

2. Method of Manufacturing Multilayer Ceramic Electronic Component

A method of manufacturing the multilayer ceramic electronic component 10A will be described as a non-limiting example of a method of manufacturing a multilayer ceramic electronic component including the above-described structure. In the following description of the manufacturing method, each multilayer ceramic electronic component body 12 is a multilayer ceramic capacitor.

(1) Method of Manufacturing Multilayer Ceramic Electronic Component Body

First, ceramic green sheets are formed by spreading ceramic paste containing ceramic powder by, for example, screen printing, and drying the ceramic paste.

Next, conductive paste that defines the inner electrodes is applied to some of the ceramic green sheets in a certain pattern by, for example, screen printing. Thus, ceramic green sheets on which inner-electrode conductive patterns are included and ceramic green sheets on which no inner-electrode conductive patterns are included are prepared. A known binder or solvent may be contained in the ceramic paste or the conductive paste for forming the inner electrodes.

Subsequently, a mother multilayer body is formed by stacking a predetermined number of outer-layer ceramic green sheets on which no inner-electrode conductive patterns are formed, ceramic green sheets on which the inner-electrode conductive patterns are formed, and a predetermined number of ceramic green sheets on which no inner-electrode conductive patterns are formed, in that order. The ceramic green sheets on which the inner-electrode conductive patterns are formed are stacked with extended portions of the inner-electrode conductive patterns arranged in an alternate pattern. The mother multilayer body may be compressed in the lamination direction, for example, isostatic pressing.

After that, a raw multilayer chip is formed by cutting the mother multilayer body into a predetermined shape and size. The raw multilayer chip may be subjected to, for example, barrel grinding to round the corners and ridges thereof.

Subsequently, the raw multilayer chip that has been cut out is baked. Thus, a multilayer body in which first and second inner electrode layers are located, in which the first inner electrode layers extend to a first end surface, and in which the second inner electrode layers extend to a second end surface is obtained. The baking temperature of the raw multilayer chip depends on the ceramic material and the material of the conductive paste used to form the inner electrodes. Preferably, the baking temperature is in the range from about 900° C. to about 1300° C., for example.

Next, underlying electrode layers are formed on the multilayer chip that has been baked. First, conductive paste for forming the outer electrodes is applied to both end surfaces of the multilayer chip, and is baked to form a first underlying electrode layer of the first outer electrode 26a and a second underlying electrode layer of the second outer electrode 26b. The baking temperature is preferably in the range from about 700° C. to about 900° C., for example.

After that, plating layers are formed on the surfaces of the underlying electrode layers, and thus the outer electrodes 26 are formed. The multilayer ceramic electronic component body 12 illustrated in FIG. 2 includes Ni plating layers and Sn plating layers as the plating layers formed on the underlying electrode layers. The Ni plating layers and the Sn plating layers are successively formed by, for example, electroplating or electroless plating.

Each of the multilayer ceramic electronic component bodies 12 illustrated in FIG. 1 is manufactured by the above-described method.

(2) Method of Attaching Metal Terminals

Subsequently, the metal terminals 30 are attached to the multilayer ceramic electronic component bodies 12.

First, the first metal terminal 30a and the second metal terminal 30b are prepared.

Next, the metal terminals 30 are attached to the outer electrodes 26 of the multilayer ceramic electronic component bodies 12 by a joining material. In this example, solder is the joining material. The solder is preferably heated to a temperature in the range from about 270° C. to about 290° C. for about 30 seconds in a reflow process, for example.

(3) Method of Forming Cover Material

Subsequently, the cover material 50 of the multilayer ceramic electronic component 10A is formed. The cover material 50 is formed by, for example, transfer molding. More specifically, a multilayer ceramic electronic component on which the cover material 50 is not yet formed is placed in a mold filled with a resin for forming the cover material 50, and then the resin is cured so that the cover material 50 is formed in a predetermined position.

Next, unnecessary portions of the metal terminals 30 are cut off. The metal terminals 30 are cut with, for example, a punching die.

Then, the metal terminals 30 are bent into a desired shape. The metal terminals 30 are bent into a desired shape by, for example, a bending die.

Thus, the multilayer ceramic electronic component 10A illustrated in FIG. 1 is manufactured.

3. Experimental Examples

Samples of the multilayer ceramic electronic component 10A according to Example were manufactured by the above-described manufacturing method, and the electrostatic capacitance, the creeping distance, and the mounting area thereof were measured.

The samples of the multilayer ceramic electronic component 10A according to Example manufactured by the above-described manufacturing method had the following specifications:

Size L×W×T of multilayer ceramic electronic component (design values, metal terminals included): about 12.4 mm×about 14.3 mm×about 5.9 mm
Capacitance: about 0.60 µF
Rated working voltage: about 1250 V
Creeping distance: about 8.1 mm
Number and structure of multilayer ceramic electronic component bodies: 4, parallel connection
Metal terminals:
  Terminal body: SUS430
  Plating film: Two-layer structure including Ni plating layer and Sn plating layer
Cover material: Epoxy resin The multilayer ceramic electronic component bodies included in the multilayer ceramic electronic component were multilayer ceramic capacitors with the following specifications:

Size l×w×t of multilayer ceramic electronic component body (design values): about 5.7 mm×about 5.0 mm×about 2.0 mm
Material of ceramic layers: $BaTiO_3$
Capacitance: about 0.15 µF
Rated working voltage: about 1250 V
Material of inner electrode layers: Ni
Outer electrodes:
  Underlying electrode layer: Electrode containing Cu and glass
  Plating layer: Two-layer structure including Ni plating layer (thickness: about 3.5 µm) and Sn plating layer (about 3.5 µm)

Figure 25A:
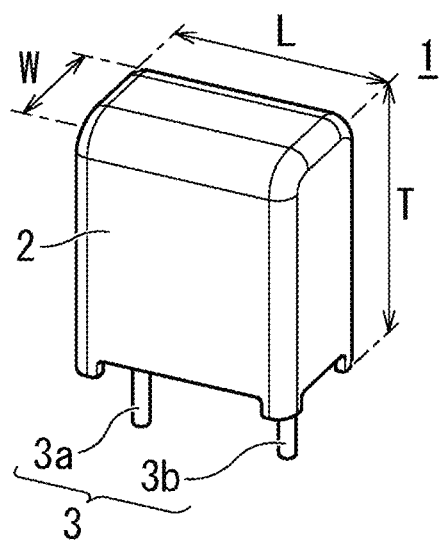
FIG. 25A is an external perspective view of an example of a film capacitor according to Comparative Example 1.

Samples of a film capacitor 1 illustrated in FIG. 25A were prepared as Comparative Example 1. The film capacitor 1 includes a substantially rectangular-parallelepiped-shaped capacitor body 2 and a pair of metal terminals 3. The metal terminals 3 include a first metal terminal 3a and a second metal terminal 3b.

Figure 25B:
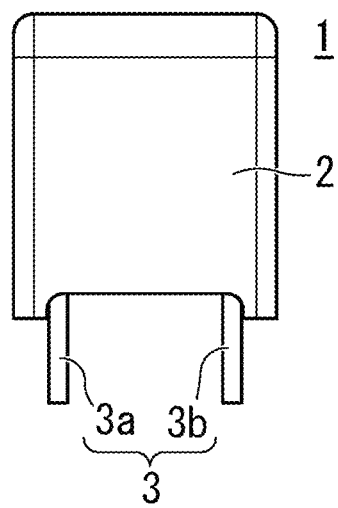
FIG. 25B is a front view of the film capacitor.

Referring to FIGS. 25A and 25B, in front view, the dimension of the film capacitor 1 in a width direction of the capacitor body 2 is defined as dimension L. The dimension of the film capacitor 1 in a front-back direction of the capacitor body 2 is defined as dimension W. The dimension of the film capacitor 1 including the capacitor body 2, the first metal terminal 3a, and the second metal terminal 3b in a height direction is defined as dimension T.

The samples of the film capacitor according to Comparative Example 1 had the following specifications:

Size L×W×T of film capacitor (design values, metal terminals included): about 31.5 mm×about 11.0 mm×about 27.0 mm
Dielectric material: polypropylene
Capacitance: about 0.33 µm
Rated working voltage: about 1000 V
Creeping distance: about 27.5 mm
Material of inner electrodes: Al
Cover material: Epoxy resin Samples of a multilayer ceramic electronic component 4 including metal terminals illustrated in FIG. 26A were prepared as Comparative Example 2. The multilayer ceramic electronic component 4 including metal terminals includes two multilayer ceramic capacitors 5, which are multilayer ceramic electronic component bodies, and a pair of metal terminals 6. The metal terminals 6 include a first metal terminal 6a and a second metal terminal 6b.

Figure 26A:
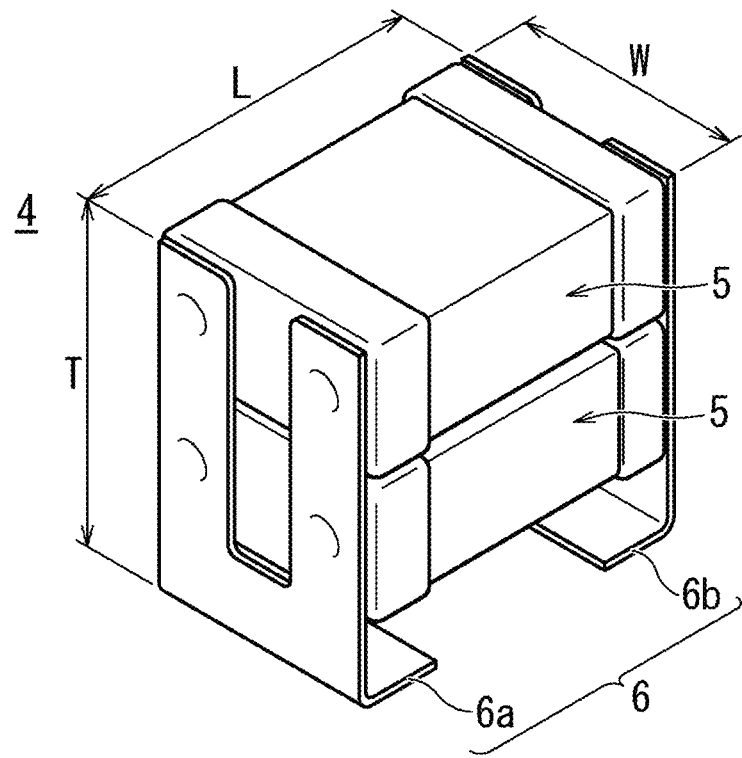
FIG. 26A is an external perspective view of a multilayer ceramic electronic component including metal terminals according to Comparative Example 2.
Figure 26B:
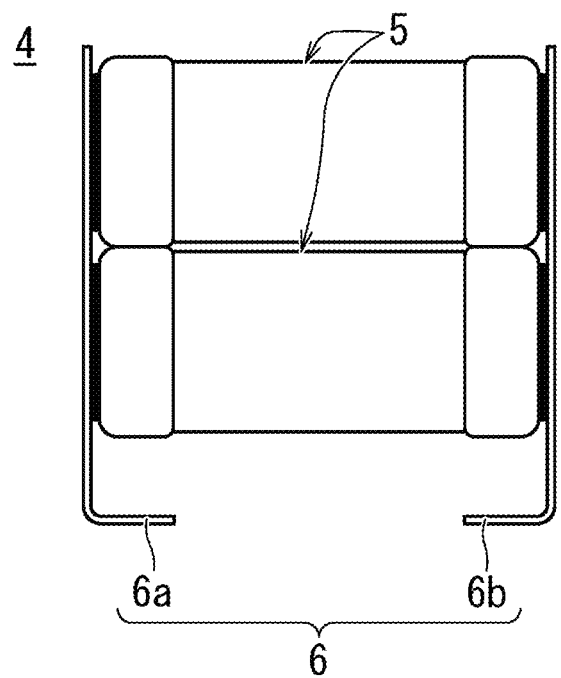
FIG. 26B is a front view of the multilayer ceramic electronic component.

Referring to FIGS. 26A and 26B, in front view, the dimension of the multilayer ceramic electronic component 4 including the first metal terminal 6a and the second metal terminal 6b in a width direction is defined as dimension L. The dimension of the multilayer ceramic electronic component 4 in a front-back direction is defined as dimension W. The dimension of the multilayer ceramic electronic component 4 including the first metal terminal 6a and the second metal terminal 6b in a height direction is defined as dimension T.

The samples of the multilayer ceramic electronic component including the metal terminals according to Comparative Example 2 had the following specifications:

Size L×W×T of multilayer ceramic electronic component (design values, metal terminals included): about 6.1 mm×about 5.3 mm×about 6.4 mm
Capacitance: about 0.56 µF
Rated working voltage: about 630 V
Creeping distance: about 4.0 mm
Number and structure of multilayer ceramic electronic component bodies: 2, parallel connection
Metal terminals:
  Terminal body: SUS430
  Plating film: Two-layer structure including Ni plating layer and Sn plating layer The specifications of the multilayer ceramic capacitors 5, which are the multilayer ceramic electronic component bodies included in the multilayer ceramic electronic component 4 including the metal terminals, are similar to those of the multilayer ceramic electronic component bodies 12 according to Example.

Method of Measuring Electrostatic Capacitance

The electrostatic capacities of the capacitors according to Example, Comparative Example 1, and Comparative Example 2 were measured under the measurement conditions according to the standard specification (JIS C 5101-11998) using an electrostatic capacitance measurement device (LCR meter).

Method of Measuring Dimensions of Each Sample

The dimensions of the electronic components according to Example, Comparative Example 1, and Comparative Example 2 were measured using a micrometer.

Method of Measuring Creeping Distance

The creeping distances of the samples according to Example, Comparative Example 1, and Comparative Example 2 were measured using a measurement function of a microscope.

Method of Detecting Creeping Discharge

An AC voltage of 3 kV was applied to each sample, and whether or not a dielectric breakdown had occurred was determined based on the current. It was determined that a creeping discharge had occurred if a breakdown of the sample occurred after the application of the AC voltage, and that no creeping discharge had occurred if a breakdown of the sample did not occur.

Table 1 shows the measurement results of Embodiment Example, Comparative Example 1, and Comparative Example 2.

TABLE 1

| | Electrostatic capacitance (µF) | Allowable difference in electrostatic capacitance (%) | Rated working voltage (V) | Guaranteed temperature (° C.) | Dimensions (metal terminals included) | | | | Mounting volume (mm$^3$) | Mounting area (mm$^2$) | Mounting Type | Number of occurrences of creeping discharge (AC: 3 kV) |
|---|---|---|---|---|---|---|---|---|---|---|---|---|
| | | | | | Dimension L (mm) | Dimension W (mm) | Dimension T (mm) | Creeping distance (mm) | | | | |
| Comparative Example 1 | 0.33 | ±10 | 1000 | −55 to 100 | 31.5 | 11.0 | 27.0 | 27.5 | 9356 | 347 | Through-hole | 0/10 |
| Comparative Example 2 | 0.56 | ±10 | 630 | −55 to 100 | 6.1 | 5.3 | 6.4 | 4.0 | 1241 | 32 | Surface mounting | 10/10 |
| Embodiment Example | 0.63 | ±10 | 1250 | −55 to 100 | 12.4 | 14.3 | 5.9 | 8.1 | 1046 | 177 | Surface mounting | 0/10 |

Figure 27A:
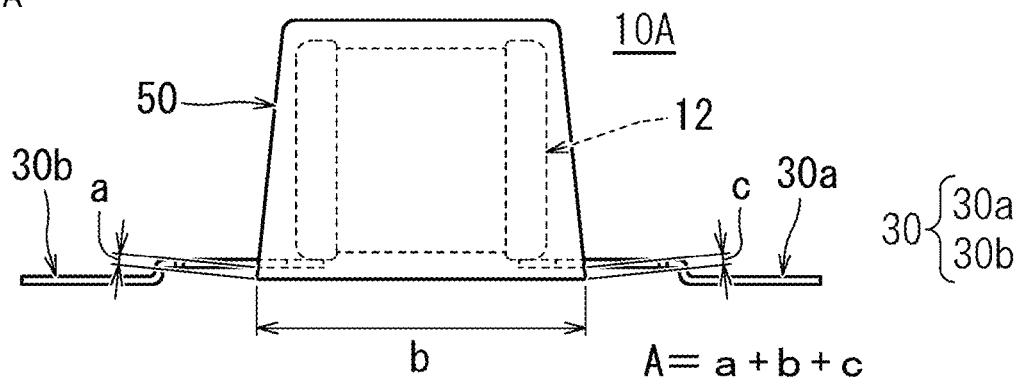
FIG. 27A illustrates a creeping distance A of a multilayer ceramic electronic component according to Example.

Referring to FIG. 27A, an LT plane of each sample of Example was observed with the microscope, and a length A between the first metal terminal 30a and the second metal terminal 30b along the cover material 50 was measured. The length A (creeping distance A) between the first metal terminal 30a and the second metal terminal 30b along the cover material 50 is the sum of a distance a from the bottom end of the first metal terminal 30a to the second principal surface 50b of the cover material 50, a length b of the second principal surface 50b of the cover material 50 in the width direction Y, and a distance c from the second principal surface 50b of the cover material 50 to the bottom end of the second metal terminal 30b.

Figure 27B:
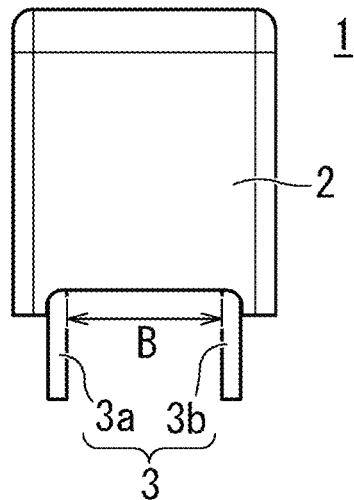
FIG. 27B illustrates a creeping distance B of the film capacitor according to Comparative Example 1.

Referring to FIG. 27B, similar to the samples of Example, an LT plane of each sample of Comparative Example 1 was observed with the microscope, and a length B (creeping distance B) between the first metal terminal 3a and the second metal terminal 3b along the cover material was measured. When the surface of the film capacitor is curved between the first metal terminal 3a and the second metal terminal 3b, the length along the curved surface was measured.

Figure 27C:
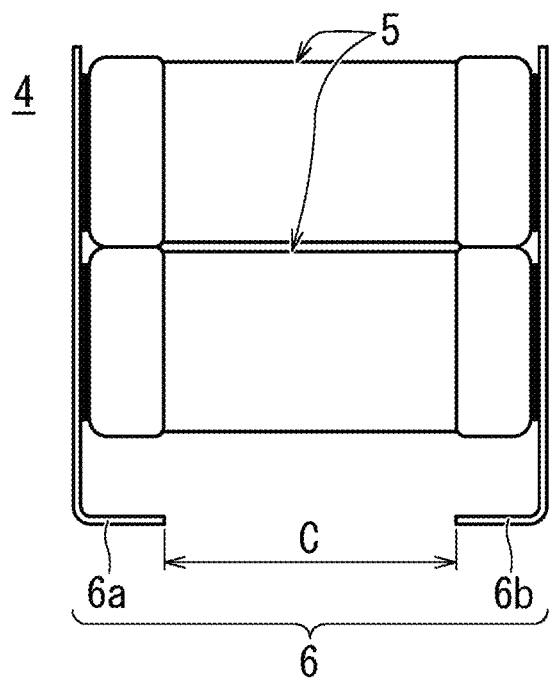
FIG. 27C illustrates a creeping distance C of the multilayer ceramic electronic component including metal terminals according to Comparative Example 2.

Referring to FIG. 27C, similar to the samples of Example, an LT plane of each sample of Comparative Example 2 was observed with the microscope, and a length C (creeping distance C) between the first metal terminal 6a and the second metal terminal 6b was measured.

Method of Measuring Mounting Area

The lengths of each sample along the outline when viewed in a direction orthogonal to the surface of the mounting board were measured with a micrometer, and the mounting area was calculated from the measured lengths.

Method of Measuring Mounting Volume

The lengths of each sample along the outline when viewed in the direction orthogonal to the surface of the mounting board and the height of each sample were measured with a micrometer, and the mounting volume was calculated from the measured lengths and height.

The samples of the multilayer ceramic electronic component according to Embodiment Example had an electrostatic capacitance of about 0.63 µF, a creeping distance of about 8.1 mm, a mounting area of about 177 mm$^2$, and a mounting volume of about 1046 mm$^3$. No creeping discharge occurred in any of 10 samples.

The samples of the film capacitor according to Comparative Example 1 had an electrostatic capacitance of about 0.33 µF, a creeping distance of about 27.5 mm, a mounting area of about 347 mm$^2$, and a mounting volume of about 9356 mm$^3$. No creeping discharge occurred in any of 10 samples.

The samples of the multilayer ceramic electronic component including the metal terminals according to Comparative Example 2 had an electrostatic capacitance of about 0.56 µF, a creeping distance of about 4.0 mm, a mounting area of about 32 mm$^2$, and a mounting volume of about 1241 mm$^3$. A creeping discharge occurred in all of 10 samples.

The above results show that the multilayer ceramic electronic component according to Embodiment Example has a creeping distance that is shorter than that of the film capacitor according to Comparative Example 1 but is large enough to significantly reduce or prevent creeping discharge. Thus, creeping discharge is able to be reduced. In addition, the mounting area and the mounting volume are able to be greatly reduced, so that size reduction is able to be provided. In addition, the multilayer ceramic electronic component according to Embodiment Example includes the metal terminals, and is therefore surface-mountable to the mounting board. In addition, compared to the multilayer ceramic electronic component including the metal terminals according to Comparative Example 2, the multilayer ceramic electronic component according to Embodiment Example has a lower risk of creeping discharge and a smaller mounting volume.

The present invention is not limited to the above-described preferred embodiments of the present invention.

The mechanisms, shapes, materials, numbers, positions, arrangements, etc., in the above-described preferred embodiments may be modified in various ways without departing from the scope of the technical idea and objects of the present invention, and such modifications are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a plurality of multilayer ceramic electronic component bodies, each of the plurality of multilayer ceramic electronic component bodies including:
   a multilayer body including ceramic layers that are laminated, the multilayer body including a first principal surface and a second principal surface that are opposite to each other in a height direction, a first side surface and a second side surface that are opposite to each other in a width direction orthogonal or substantially orthogonal to the height direction, and a first end surface and a second end surface that are opposite to each other in a length direction orthogonal or substantially orthogonal to the height direction and the width direction,
   a first outer electrode provided on the first end surface, at least a portion of the first side surface, and at least a portion of the second side surface of the multilayer body, and
   a second outer electrode provided on the second end surface, at least a portion of the first side surface, and at least a portion of the second side surface of the multilayer body;
a first metal terminal connected to the first outer electrodes of the multilayer ceramic electronic component bodies; and
a second metal terminal connected to the second outer electrodes of the multilayer ceramic electronic component bodies; wherein
a dimension t of each of the multilayer ceramic electronic component bodies in the height direction connecting the first principal surface and the second principal surface is less than a dimension w of each of the multilayer ceramic electronic component bodies in the width direction connecting the first side surface and the second side surface;
each of the multilayer ceramic electronic component bodies is positioned with one of the first side surface and second side surface facing a mounting surface of a mounting substrate;
the first metal terminal extends between the first outer electrodes of the multilayer ceramic electronic component bodies;
the second metal terminal extends between the second outer electrodes of the multilayer ceramic electronic component bodies;
the first metal terminal includes a first mounting portion extending away from the plurality of multilayer ceramic electronic component bodies in the length direction of each of the plurality of multilayer ceramic electronic component bodies;
the second metal terminal includes a second mounting portion extending away from the plurality of multilayer ceramic electronic component bodies in the length direction of each of the plurality of multilayer ceramic electronic component bodies;
the first and second mounting portions are mountable on the mounting substrate;
the plurality of multilayer ceramic electronic component bodies, the first outer electrodes, and the second outer electrodes of the plurality of multilayer ceramic electronic component bodies, at least a portion of the first metal terminal, and at least a portion of the second metal terminal are covered by a cover material;
the first metal terminal further includes:
   a first joining portion connected to the first outer electrodes, extending continuously between the first external electrodes in a direction parallel or substantially parallel to the mounting surface, and continuously facing the one of the first side surface and second side surface of each of the plurality of multilayer ceramic electronic component bodies;
   a first extending portion connected to the first joining portion and longitudinally extending away from each of the plurality of multilayer ceramic electronic component bodies in the length direction of each of the plurality of multilayer ceramic electronic component bodies; and
   a second extending portion connected to the first extending portion and extending toward the mounting surface to provide a gap between the mounting surface and the one of the first side surface and second side surface of each of the plurality of multilayer ceramic electronic component bodies;
the first mounting portion is connected to the second extending portion and extends parallel or substantially parallel to the mounting surface;
the first extending portion extends in the direction parallel or substantially parallel to the mounting surface away from a first side surface of the cover material that is adjacent to the first end surface of each multilayer ceramic electronic component body;
the second metal terminal further includes:
   a second joining portion connected to the second outer electrodes, extending continuously between the second external electrodes in a direction parallel or substantially parallel to the mounting surface, and continuously facing the one of the first side surface and second side surface of each of the plurality of multilayer ceramic electronic component bodies;
   a third extending portion connected to the second joining portion and longitudinally extending away from each of the plurality of multilayer ceramic electronic component bodies in the length direction of each of the plurality of multilayer ceramic electronic component bodies; and
   a fourth extending portion connected to the third extending portion and extending toward the mounting surface to provide a gap between the mounting surface and the one of the first side surface and second side surface of each of the plurality of multilayer ceramic electronic component bodies;
the second mounting portion is connected to the fourth extending portion and extends parallel or substantially parallel to the mounting surface; and
the third extending portion extends in the direction parallel or substantially parallel to the mounting surface away from a second side surface of the cover material that is adjacent to the second end surface of each multilayer ceramic electronic component body.

2. The multilayer ceramic electronic component according to claim 1, wherein
the second extending portion of the first metal terminal includes a cut portion; and
the fourth extending portion of the second metal terminal includes a cut portion.

3. The multilayer ceramic electronic component according to claim 1, wherein
the first mounting portion of the first metal terminal includes a cut portion; and
the second mounting portion of the second metal terminal includes a cut portion.

4. The multilayer ceramic electronic component according to claim 1, wherein the cover material covers the plurality of multilayer ceramic electronic component bodies, the first joining portion and a portion of the first extending portion of the first metal terminal, and the second joining portion and a portion of the third extending portion of the second metal terminal.

5. The multilayer ceramic electronic component according to claim 1, wherein the cover material has a rectangular or substantially rectangular parallelepiped shape or a trapezoidal or substantially trapezoidal shape.

6. The multilayer ceramic electronic component according to claim 1, wherein each of the plurality of multilayer ceramic electronic component bodies includes a plurality of inner electrode layers that are laminated.

7. The multilayer ceramic electronic component according to claim 6, wherein the plurality of inner electrode layers define an inductor.

8. The multilayer ceramic electronic component according to claim 6, wherein the plurality of inner electrode layers include a plurality of first inner electrode layers that are electrically connected to the first outer electrode and a plurality of second inner electrode layers that are electrically connected to the second outer electrode.

9. The multilayer ceramic electronic component according to claim 1, wherein the first outer electrode and the second outer electrode each include an underlying electrode layer and a plating layer that covers the underlying electrode layer.

10. The multilayer ceramic electronic component according to claim 9, wherein the underlying electrode layer includes at least one of a baked layer, a resin layer, and a thin film layer.

11. The multilayer ceramic electronic component according to claim 1, wherein the cover material is a resin or a plastic material.

12. The multilayer ceramic electronic component according to claim 11, wherein the cover material is a thermosetting epoxy resin.

13. The multilayer ceramic electronic component according to claim 1, wherein the first joining portion is continuously connected to the first outer electrode, and the second joining portion is continuously connected to the second outer electrode.

14. The multilayer ceramic electronic component according to claim 1, wherein the first joining portion entirely or substantially entirely covers the first outer electrode on the first side surface, and the second joining portion entirely or substantially entirely covers the second outer electrode on the first side surface.

15. The multilayer ceramic electronic component according to claim 1, wherein the first joining portion and the second joining portion continuously extend over a region including gaps between layers of the multilayer body.

16. The multilayer ceramic electronic component according to claim 1, wherein a first end of the first joining portion that is closest to the first end surface protrudes by a first distance of about 0.05 mm to about 0.25 mm from an edge of the first outer electrode on the first side surface.

17. The multilayer ceramic electronic component according to claim 1, wherein a second end of the first joining portion that is closest to the second end surface protrudes by a distance of about 0.05 mm to about 0.25 mm from the edge of the first outer electrode on the first side surface.

18. The multilayer ceramic electronic component according to claim 1, wherein a length of the first joining portion in the width direction that is orthogonal or substantially orthogonal to a lamination direction of the multilayer body is less than a length of the first outer electrode on the first side surface, and a length of the second joining portion in the width direction is less than a length of the second outer electrode on the first side surface.

19. The multilayer ceramic electronic component according to claim 1, wherein
the first metal terminal and the second metal terminal are each a plate-shaped lead frame;
the first extending portion includes a first recessed portion that exposes a base material layer of the plate-shaped lead frame; and
the second extending portion includes a second recessed portion that exposes the base material layer of the plate-shaped lead frame.

* * * * *